Oct. 31, 1961  R. W. TRIPP  3,007,096
TWO OR THREE DIMENSIONAL DIGITAL MACHINE TOOL CONTROL
Filed Sept. 11, 1957  13 Sheets-Sheet 1

ROBERT W. TRIPP,
INVENTOR.

BY W. E. Beatty
ATTORNEY.

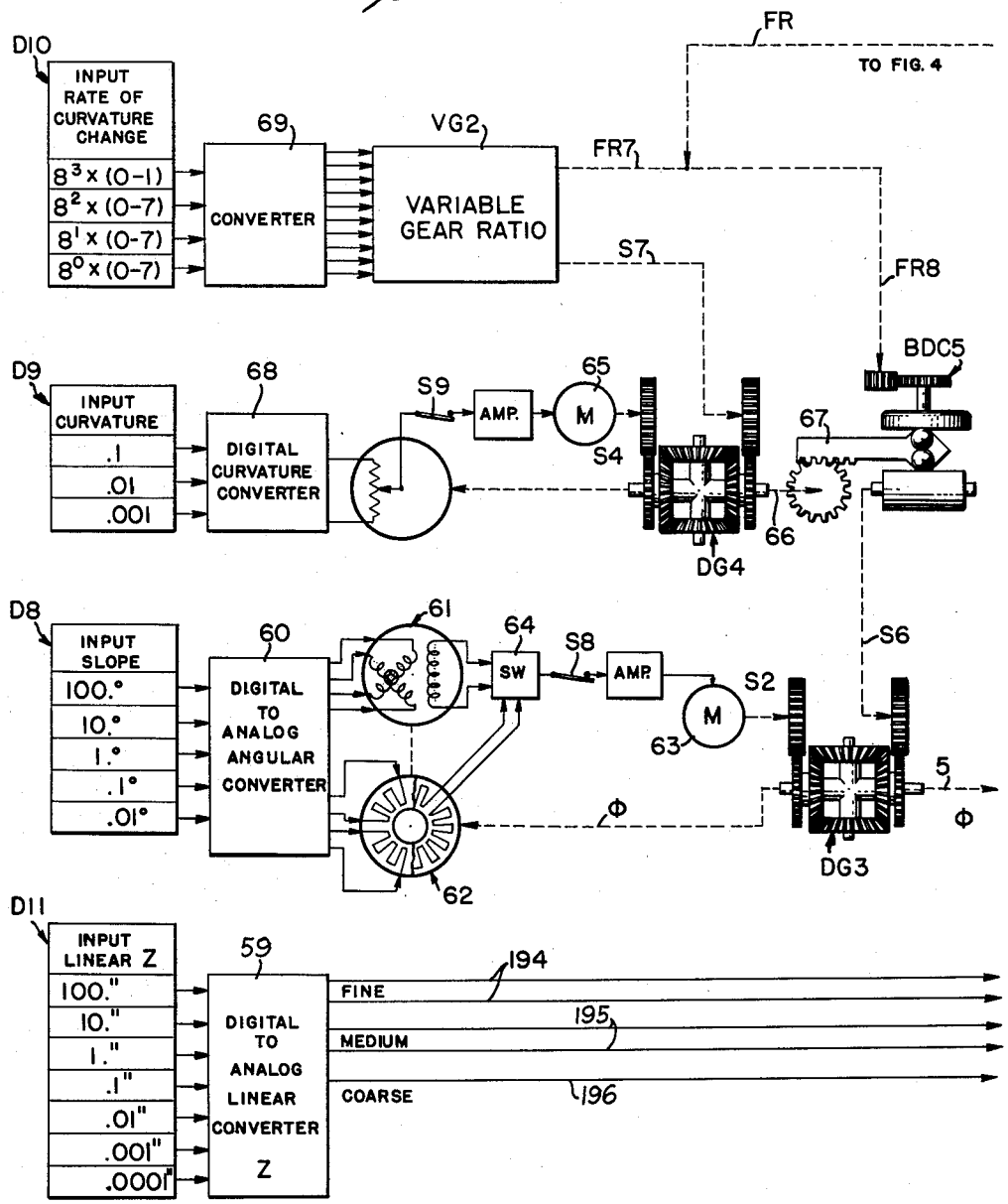

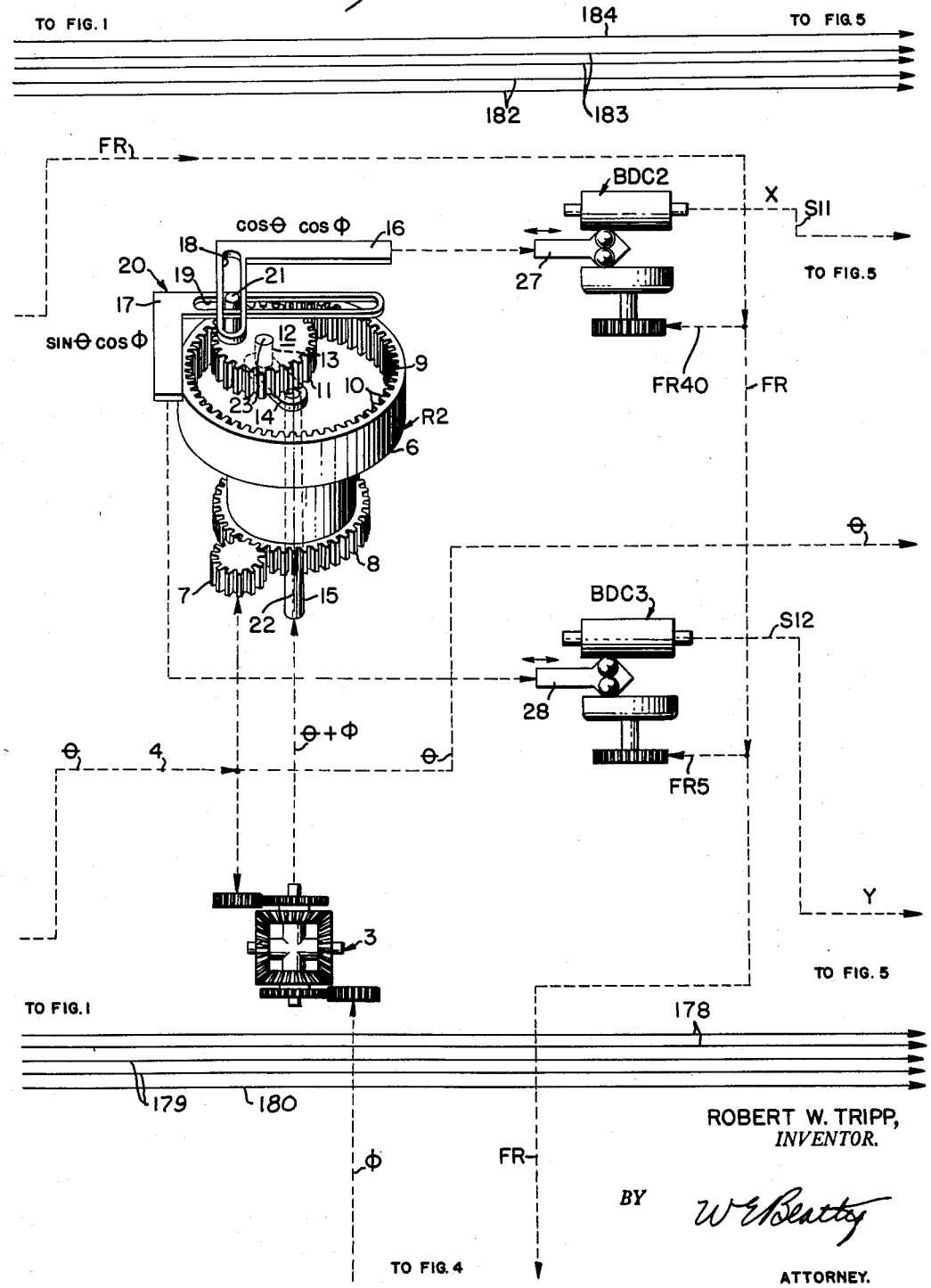

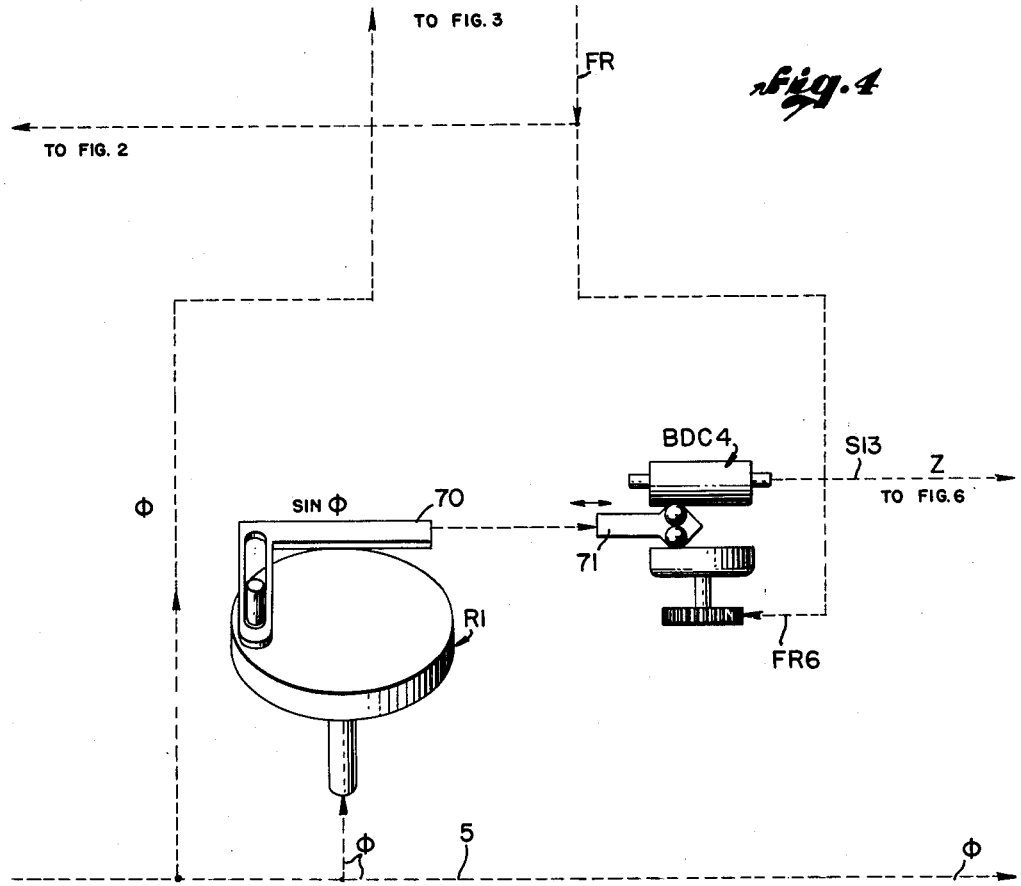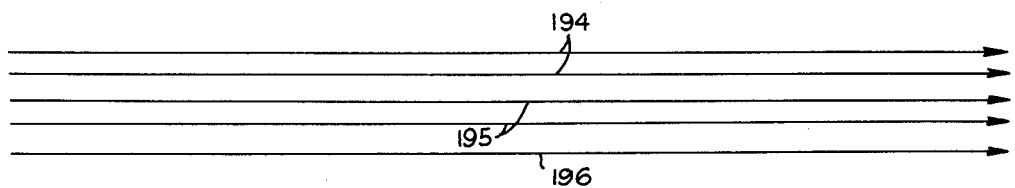

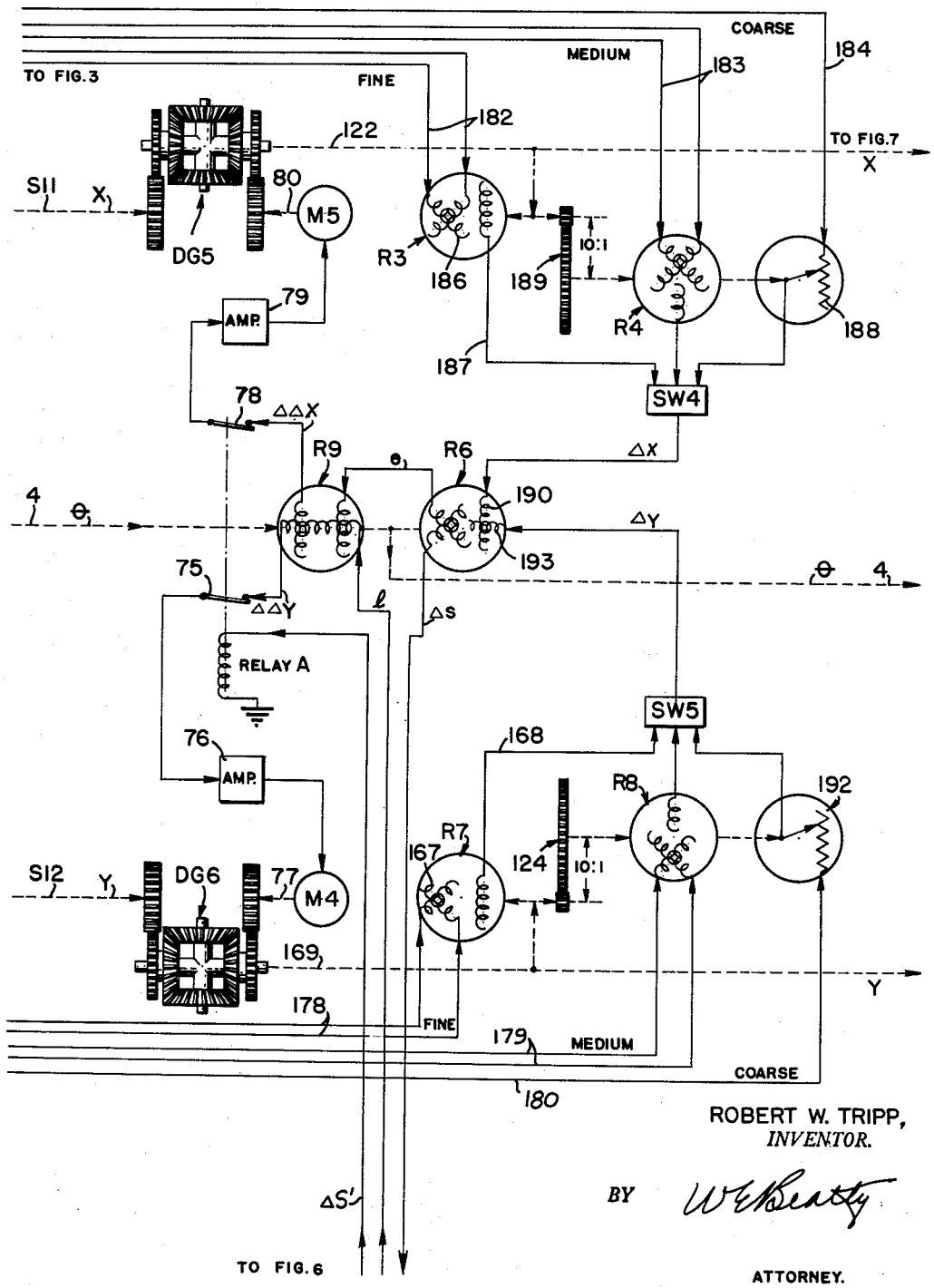

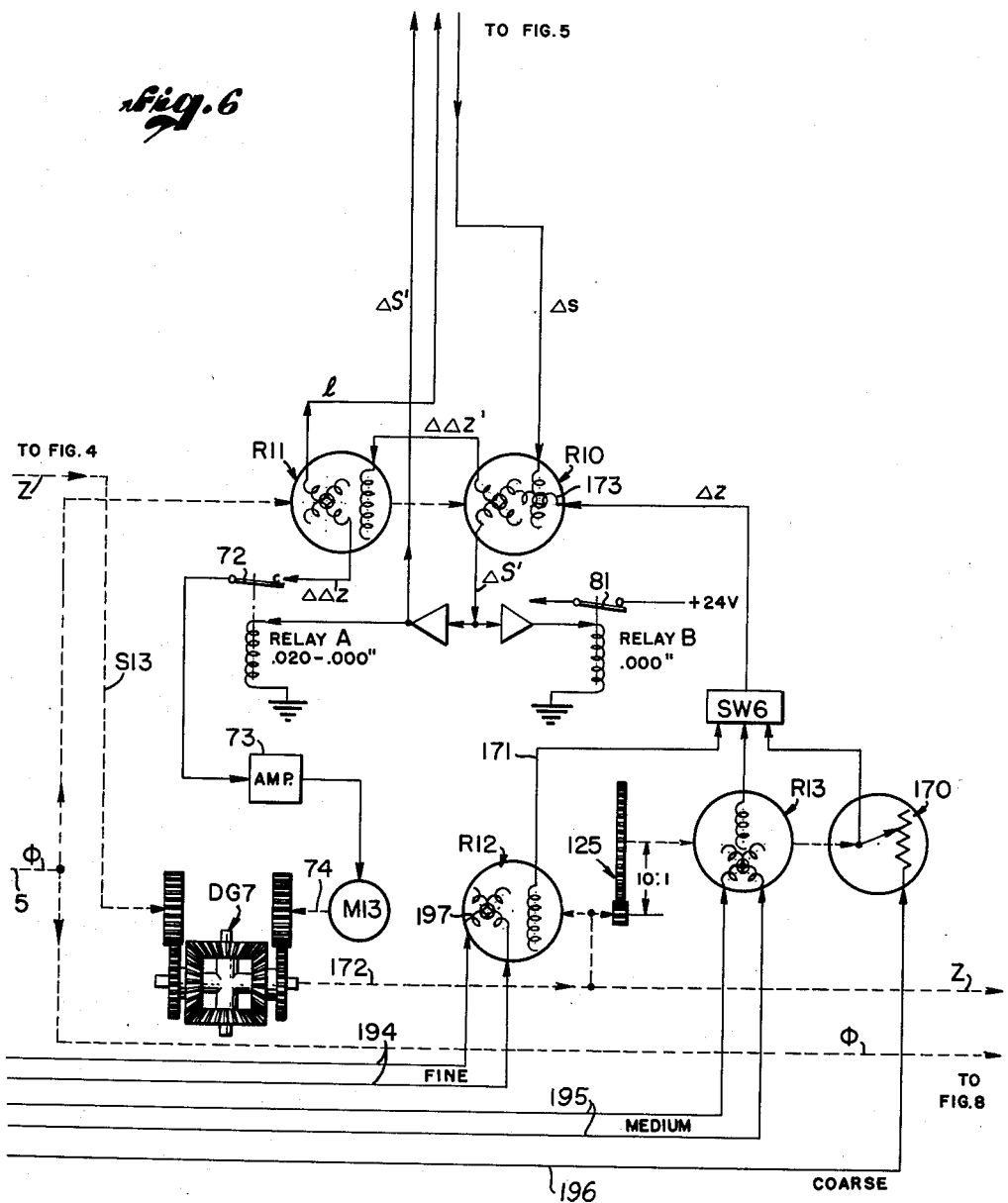

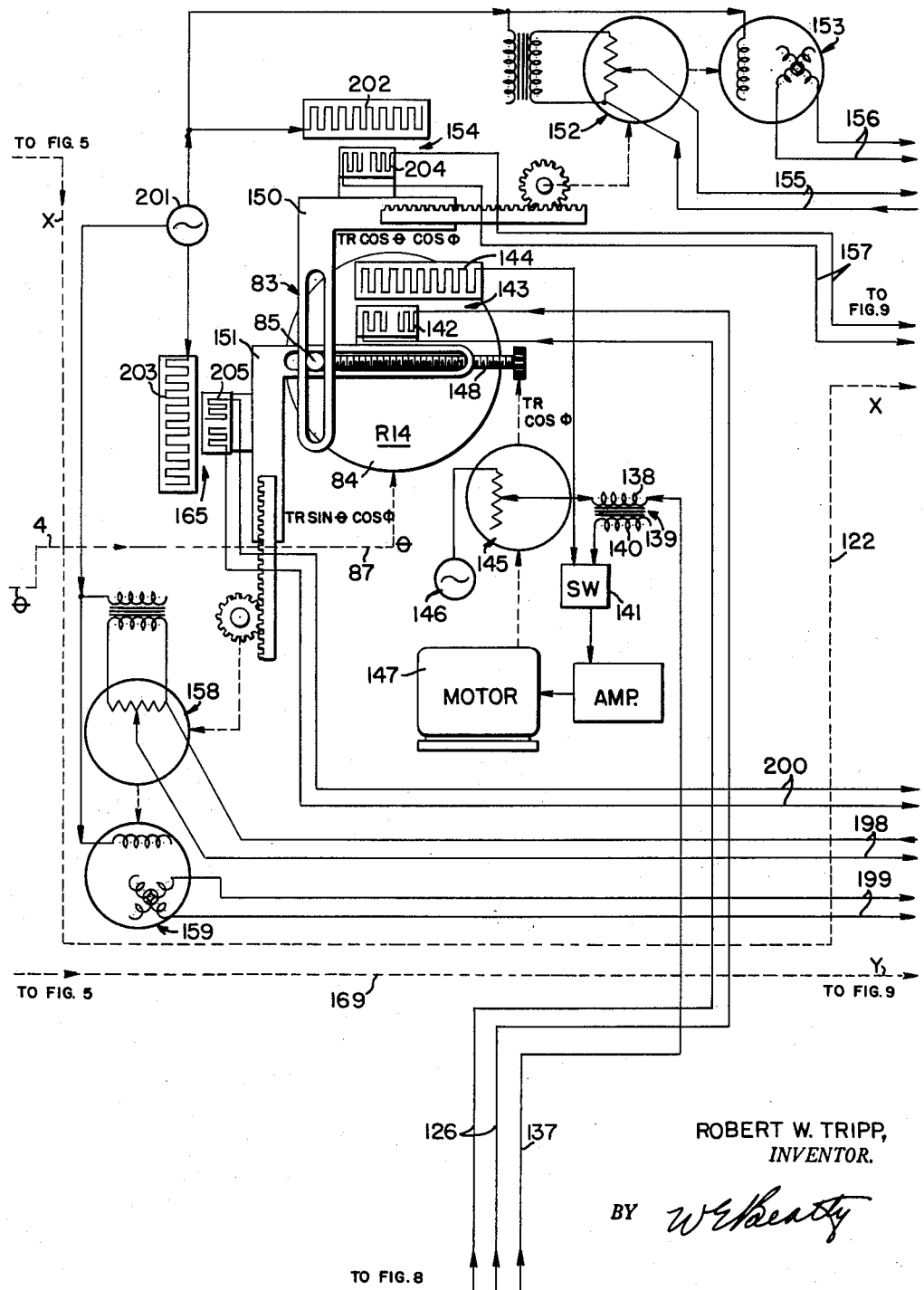

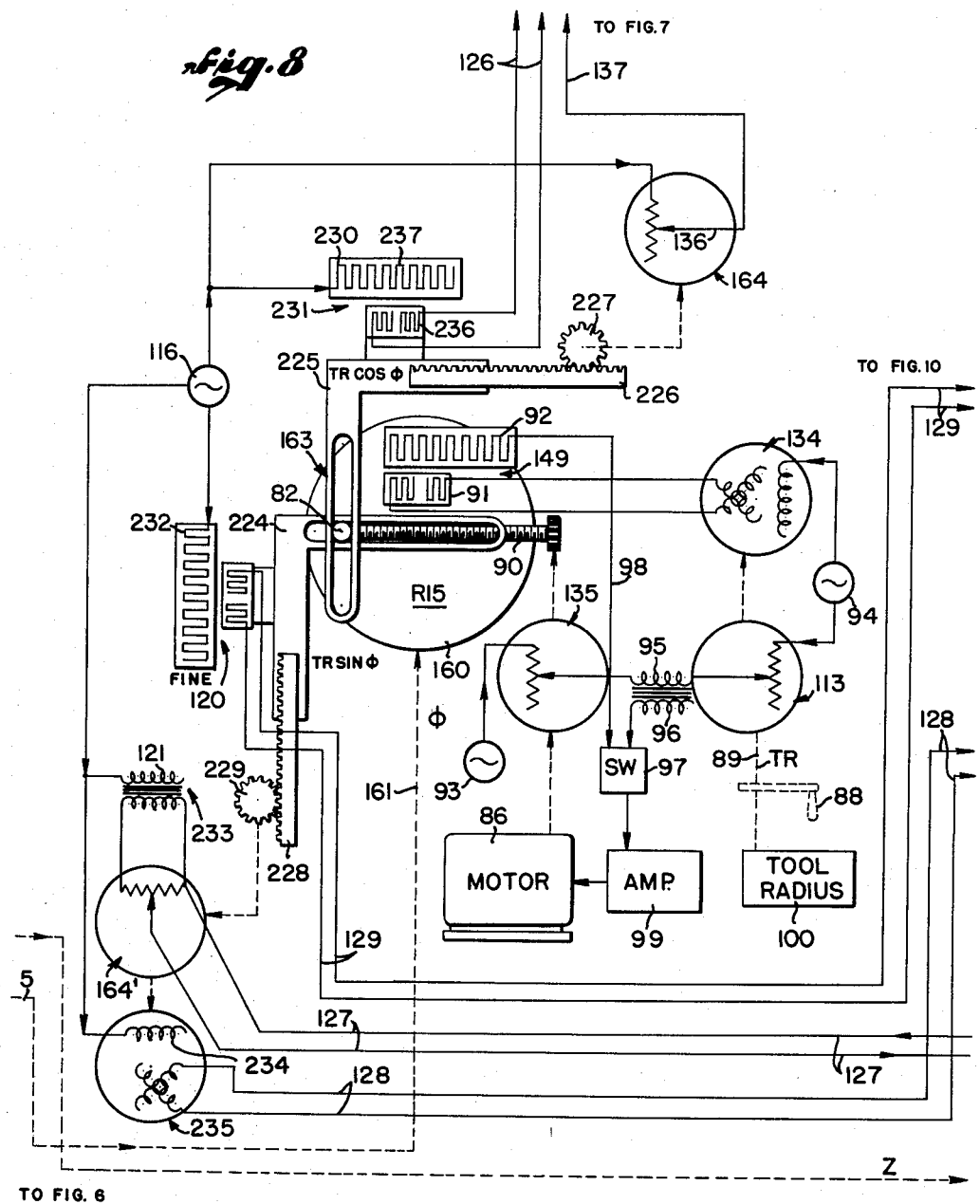

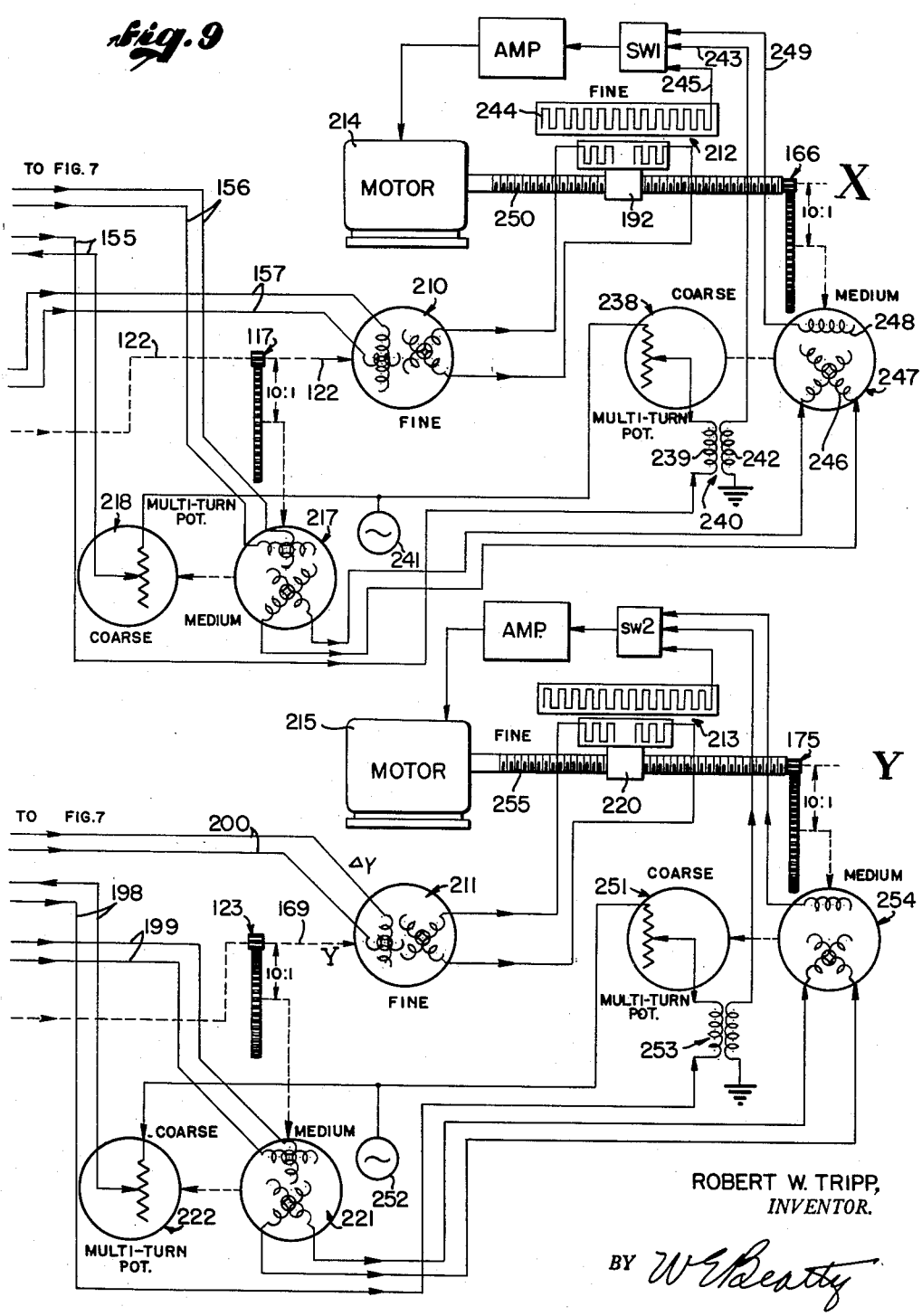

Fig. 10

Oct. 31, 1961 R. W. TRIPP 3,007,096
TWO OR THREE DIMENSIONAL DIGITAL MACHINE TOOL CONTROL
Filed Sept. 11, 1957 13 Sheets-Sheet 11

ROBERT W. TRIPP,
INVENTOR.

BY W E Beatty

ATTORNEY.

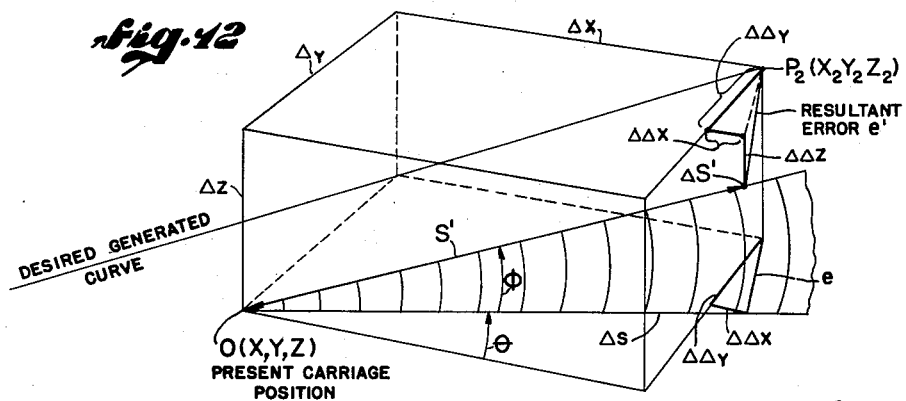
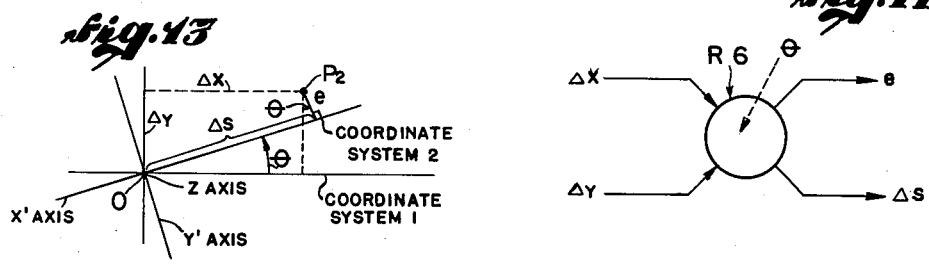
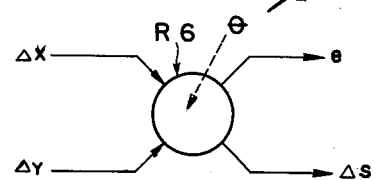
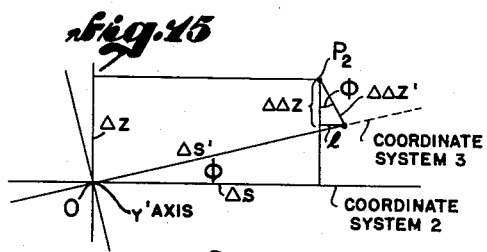
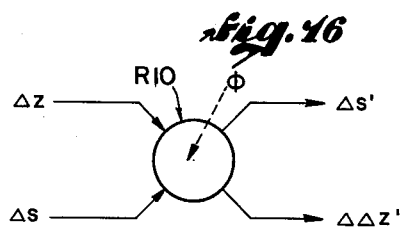
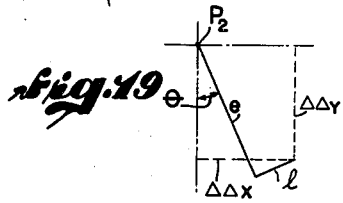
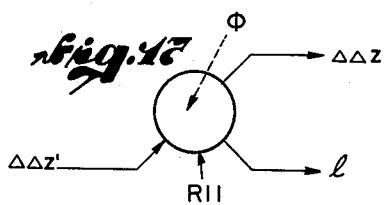
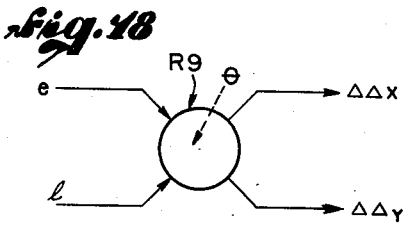
ROBERT W. TRIPP,
INVENTOR.

Oct. 31, 1961 R. W. TRIPP 3,007,096
TWO OR THREE DIMENSIONAL DIGITAL MACHINE TOOL CONTROL
Filed Sept. 11, 1957 13 Sheets-Sheet 13

ROBERT W. TRIPP,
INVENTOR.

BY *W E Beatty*

ATTORNEY.

United States Patent Office 3,007,096
Patented Oct. 31, 1961

3,007,096
TWO OR THREE DIMENSIONAL DIGITAL
MACHINE TOOL CONTROL
Robert W. Tripp, Bronxville, N.Y., assignor to Inductosyn Corporation, Carson City, Nev., a corporation of Nevada
Filed Sept. 11, 1957, Ser. No. 683,494
38 Claims. (Cl. 318—162)

This invention relates to two or three dimensional digital machine tool control and in general to the two or three dimensional control of machine tools in which the rotating cutter of finite radius and a workpiece are moved relatively to each other according to a program of two or three dimensional information supplied to the traversing drives of the workpiece carriage or cutting head in the machine tool in order to generate on the workpiece a surface or profile of specified shape.

The present invention relates to an automatic machine control system for a continuous machining operation, or contour milling. This system employs the Inductosyn [1] (Pat. No. 2,799,835) as the data element.

The Inductosyn has very significant advantages as the data element for contour milling in comparison with other types of data devices. In addition to its extremely high accuracy, it permits a great simplification of the preparation of a program, provides a constant zero reference, and permits accurate checking of selected points with respect to this reference, and eliminates accumulation errors.

For the general case of cutting an arbitrary curve, the input data consists of selected coordinates along the curve to be cut. Following the data input device is a unit which may be referred to as a computer, which accepts the input data and converts it into rate drive commands for the machine drives. The machine parts then move along separate axes simultaneously at continuously-changing rates and the required curve is cut in the work-piece.

In general, the commands to the machine drives must be the rates and distances which the machine parts or carriages themselves must move in order to cut the desired curve. Nearly all machining operations utilize circular or spherical cutters, and in this case the path of a fixed point on the machine carriage (the cutter center) is not the same as the actual curve to the cut in the work-piece. It is a "parallel" curve, which is displaced along the normal to the work-piece by the amount of the cutter radius.

In automatic contouring systems, other than the present type of system, this cutter center path which must be computed and introduced as the data input to the control system is computed as an integral part of the command data input. This computation is not a simple one, since in general it is not possible to write a single equation for the required curve. There is the further disadvantage that any input program prepared in this way is valid for only one size of cutter, in one particular state of sharpening, and if the cutter is dressed or a different cutter used, an entirely new program must be prepared.

In contrast, because of the Cutter Radius Corrector, which can be realized with the Inductosyn, the present control system utilizes a program containing information on the actual curve to be cut in the work-piece, and correction for the actual radius of the cutter being used is made directly at the machine. If necessary, the correction can even be changed to compensate for cutter wear as the work proceeds.

Another advantage of the present system, is derived from the fact that, while the input data of the system are in digital form, the actual machine drive control is an analog type of system. This results in the cutting of a continuous, smooth curve in the work-piece, in contrast to the succession of short chords or arcs which results from systems in which the digital form of data is carried all the way to the machine drive itself.

Since the command signals to the automatic contouring machine are in the form of rates, such system is inherently subject to cumulative errors resulting from the integration of small rate errors over the length of the curve being cut. In the present control system, provision is made for accurately checking the position at selected points along the curve, in advance of arrival of the cutter at that position; the error is computed and corrections made to the feed rates so that the curve will accurately pass through each of these check points.

The features of checking and correcting the integrators and the tool position for points in a plane, namely for the X and Y axes are described and were formerly claimed in Case 4, S.N. 563,125, filed February 2, 1956, by R. W. Tripp for "Automatic Digital Machine Tool Control." The instant case is a continuation of Case 4 and in addition discloses and claims the above features not only the X and Y axes but also for the Z axis.

Mechanical integrators, which may be of the ball-disk-cylinder type, are employed for integrating the curvature and rate of change of curvature signals with respect to the feed rate to obtain a slope output for combination with the output of the slope converter, providing an input for the feed resolver. The output of the feed resolver has a similar type of integrator for integrating the sine and cosine functions of the slope angle with respect to the feed rate to provide a shaft output for the coordinate tool drives. It is expected that this type of integrator will depart from ideal about one part in 1000 or less. This error is prevented from accumulating to values in excess of the tolerance. Thus, if one desires to machine a part with an accuracy of about .001 inch it will be necessary to check the progress of the curvature integrator and the integrators for the servo drive, as well as the tool position about once every inch of total motion.

The present case provides a control system to make this check, compute the error if any, correct the slope angle curvature and rate of change of curvature controls in accordance with their respective input data and also to correct the tool position without stopping the machine.

As a basis for comparison and to determine the error in the tool position, the input data includes linear position data of discreet check points such as one inch apart along the tool path. This data may be referred to as primary data and it is decimal digital data in terms of length, a converter being provided as described and claimed in co-pending application S. N. 540,429, filed October 14, 1955, by Robert W. Tripp for "Automatic Machine Control," Case 1, now Patent 2,849,668, dated August 26, 1958. As disclosed in said Case 1, coarse, medium and fine data elements are provided to obtain a large range of values with high accuracy, a potentiometer being provided as the coarse data element, a rotary resolver or position measuring transformer being provided as the medium data element and linear Inductosyn being provided as the fine data element. The decimal digital linear input data is converted into sine and cosine signals for supply to the quadrature windings of and medium and fine data elements, this difference being noted that in Case 1 the quadrature windings of the corresponding fine data element are on a linear element, whereas in Case 4 and in the present invention such windings are on a rotary element. The linear form is used elsewhere in the system. The coarse data

[1] Trademark.

element has an accuracy of about one inch in 1000, the medium data element has an accuracy of about .01 inch in 10, while the fine data element has an accuracy of .0001 inch in .10 inch. Thus the percentage accuracy of each data element is about the same of one part in 1000. These coarse and medium data elements are further described above under the paragraph heading Inductosyn.

*Position checker.*—In the two dimensional case, as the machine approaches the check point specified by the X and Y input information, the difference between the ideal position as called for by the primary input data and the actual machine position is continuously measured, the actual machine position being dependent on the command data of slope, curvature and rate of change of curvature. These differences will be the X and Y components of the distance from the check point to the actual machine position. These two differences are applied to the two windings of a resolver connected to the slope angle shaft. The output from this resolver will then be the resultant distance to the present machine position from the check point if everything has been operating perfectly and the machine is heading directly towards the check point along the present slope angle. If the machine is going to miss the check point there will be another output from the fourth winding of the resolver that is a measure of the distance by which the machine is going to miss the check point. This output is then re-resolved into $x$ and $y$ components and used to correct the X and Y integrator outputs to make sure that the machine does go through the check point accurately. From the above it can be seen that this checking information exists and is useable even while the machine is moving and therefore the checking operation can be done without stopping at the check point and correcting. This is highly desirable because a mark is always left by the tool when the machine is stopped with the tool still cutting. Case 4 and the present invention provide for keeping the tool moving with respect to the workpiece at all times to obtain a good finish on the machined surface.

The above "position check" also provides the checking moment for the curvature and slope angle checkers. This is done by observing the output of the resolver that is the resultant distance from the machine position to the check point. When this output goes through zero, that is, when the distance measured goes through zero, is the exact moment when the curvature, slope angle and position must be correct. However, since a finite time is required to make a correction, the correction is actually started a short distance in advance of this zero. However, the rate of change of curvature is read in precisely at the time that the distance is zero since the change is essentially instantaneous. This moment when the distance measured is zero is also used to tell the punched tape or card reader to advance and read the next piece of information.

The end point of one segment is the same as the starting point of the next and is the check point. However, the correction starts just prior to the end of the segment and should be complete when the end point is reached. The check points and the ends of the segments coincide.

Normally $x$, $y$ positions, slope, curvature and rate of change of curvature are supplied as the initial starting conditions. Rate of change of curvature is changed stepwise as required at each junction point between two successive segments. The other variables change continuously through the segment as a result of successive integrations.

One distinction between rate of change of curvature and the other variables is that rate of change of curvature is held constant during a segment and if changed must change discontinuously at the check point while the other variables would have the new values at the check point if the integrations were free of error.

It should be noted, however, that the position, slope and curvature can obtain their values from two sources; (1) the aforementioned integration outputs of the X and Y integrators, (2) by differential input from their respective drive motors. Corrections are made starting shortly before a check point to differentially add in such values as are required to make the values agree with the corresponding values inserted at the check point.

*Curvature and slope angle checkers.*—The curvature and slope angle data are the values that these quantities should have at the time that the machine reaches the point called for by the X and Y position information. Thus the checking operation is done only as the machine passes through or very near the checking point specified by X and Y. This moment is determined in a manner described in the section on "Position Checker." At the moment of checking, the present curvature in the machine is compared to the desired curvature given on the punched tape or card. If there is an error, it is arbitrarily corrected by the correction servo driving though the differential in the input to the curvature integrator. The resultant slight change in the curvature of the machine part will not be noticeable. Similarly at the moment of checking mentioned above, the present slope angle in the machine is compared to the desired slope angle specified on the punched paper tape or cards and any difference arbitrarily corrected. This may result in a slight change in the slope angle of the machine part, but this change will be only about 1 part in a thousand of the possible slope, so it will be a very slight change.

It will be noted that the X and Y position information is used only at or near the time when the machine is going through the check point. Similarly the curvature and slope angle information is used only at this time. Thus it is rather simple to read the information for these quantities into the machine during the time when the last information was used and before the next information is needed.

The present invention checks the slope angle and the curvature controls for the input to the feed resolver, and also check the tool position and operate the checking and the card advance in timed relation with each other.

As noted above under the heading of "Feed Rate," the X and Y drives are not prevented from operating during the transitory stage when there is an advance from one set of slope or curvature data to another. Case 3 (Patent 2,875,390, dated February 24, 1959) discloses switch PB2 in FIG. 15 in circuit with the servo control for the curvature integrator and a corresponding switch PB1 in FIG. 16 for the servo control for slope angle, both of these switches serving to disconnect the feed rate until the slope angle and curvature values as set up in their controls correspond to the values called for by their respective input data. According to the present invention, the switches PB1 and PB2 of Case 3 are operated automatically by the position checker, the feed rate drive being always in operation.

Case 241e, Ser. No. 608,024, filed Sept. 5, 1956, by Robert W. Tripp for "3-Dimensional Control Method and System"

Case 241e, now Patent 2,843,811, dated July 15, 1958, describes and claims the extension of the 2-dimensional tool control of Case 3 to the 3-dimensional axes X, Y and Z. This Case 241e also describes and claims the component solver shown herein in FIG. 3 for the feed rates on X, Y and Z axes. Case 241e does not include a specific disclosure of or claim either tool radius correction or position checking.

Case 241g, Ser. No. 608,357, filed Sept. 6, 1956, by Robert W. Tripp for "3-Dimensional Tool Radius Computer"

Case 241g describes and claims the tool radius computer of Case 5 (S. N. 561,769, filed January 1, 1956) for the 3-dimensional axes X, Y and Z and is thus the combination of Case 241e (Case 3 extended to 3-D) and Case 5 extended to 3-D.

Zero offset

Zero offset and program advance control are covered by Case 3 and "Disc. 264," S.N. 638,722, filed February 7, 1957, by R. W. Tripp for Zero Offset for Machine Tool Control.

Present invention

A number of features used in the present invention have already been described in connection with some of the co-pending cases referred to above. In general, the present invention is a combination of Case 241g which covers the tool radius computer 3-D, with improved apparatus for position checking for both 2-D and 3-D.

The present invention provides for maintaining the tool in motion during checking and correcting the integrators and the tool position. This is accomplished by controlling the servo drives for the tool or driven element in accordance with the sum of (1) the tool radius offset signal (and zero offset if any), (2) the command shaft input, namely the output from the x and y integrators, is accordance with the command input data of slope, curvature and rate of change of curvature integrated with respect to the feed rate, and (3) a servo motor driven shaft input controlled in accordance with the error if any in the tool position, that is in accordance with the difference between the ideal tool position as designated in the coarse, medium and fine increments by the primary input position data and the actual tool position resulting from the action of the command data. These shaft and electrical inputs are added in coarse, medium and fine transmitters for transmission to coarse, medium and fine receivers which control the machine servo drives. The present invention provides shaft and electrical inputs for accomplishing these features not only for 2-D but also for 3-D, by taking into account the angle $\phi$ which represents the angle that the tool path is or extends above or out of the X, Y plane. This is done by providing linear input data of an ideal or check position on the ideal path, with reference not only to the component thereof in the plane of two of the axes, but also with reference to the path component out of that plane. The invention also provides means for translating such check data both in the plane and out of the plane into check signals and it also provides means responsive to the 3-D feed rate drive and such 3-D check signals to compute the error of the amount by which the machine drives would miss the check point if they continued at the slope determined by the angles $\theta$ and $\phi$. The invention further provides means for correcting the 3-D feed rate or control drives in accordance with the error thus computed.

In certain prior practice it has been proposed to provide command data which sets up a count which is stored, the machine itself producing another count which serves to operate the machine drives until the stored count is reduced to zero. According to another proposal, an initial cut is made on the work-piece, its error computed, and another cut made accordingly. The present invention differentiates from prior arrangements of the types just described, with resulting increase in simplicity, flexibility and accuracy by taking advantage of the highly accurate performance of an Inductosyn or similar fine data element in the following way. The command data is translated into a control feed rate drive, and in so doing, an unwanted error occurs due to the integrators employed in this translation. The feed rate drive, in accordance with both the $\theta$ and $\phi$ slopes is located ahead of the machine, and in turn this feed rate drive is translated into the controlled command drives for the machine parts. As the error is thus located ahead of the machine in the control feed rate drive, being also corrected by the check data at that point which is likewise ahead of the machine, the command input data is translated into analog form, corrected for error, ahead of the machine and hence the corrected command feed rate drives represent in analog form a highly accurate drive for the machine parts. The accuracy of such corrected feed rate drives is maintained through the use of a plurality of grades of data elements one of which is a fine grade such as the Inductosyn, for translating the corrected and accurate feed rate drive into the controlled servo or command drive for the machine parts.

In thus providing $\theta$ and $\phi$ slope controls for the control feed rate drive, such drive makes it possible to employ a separate 3-D tool radius control having an input in accordance with the feed rate drive as corrected by the input check data.

For further details of the invention reference may be made to the drawings wherein, FIG. 1 is a diagram illustrating primary and command data inputs for coordinate axes X and Y and feed rate and associated converter or computer apparatus for operating the $\theta$ and feed rate shafts and for supplying linear data in X and Y, in fine, medium and coarse increments.

FIG. 2 is a diagram illustrating primary and command data inputs and associated converter or computer apparatus for operating a shaft in accordance with the angle $\phi$ and for supplying linear input information of a third coordinate axis Z in coarse, medium and fine increments.

FIG. 3 is a diagram showing schematically in perspective a component solver having inputs of $\theta$ and $\theta+\phi$ and having outputs of $\sin\theta\cos\phi$ and $\cos\phi\cos\theta$ with integrators for integrating the feed rate of such component.

FIG. 4 schematically illustrates a resolver having an input $\phi$ and a feed integrator therefor.

Figure 1:
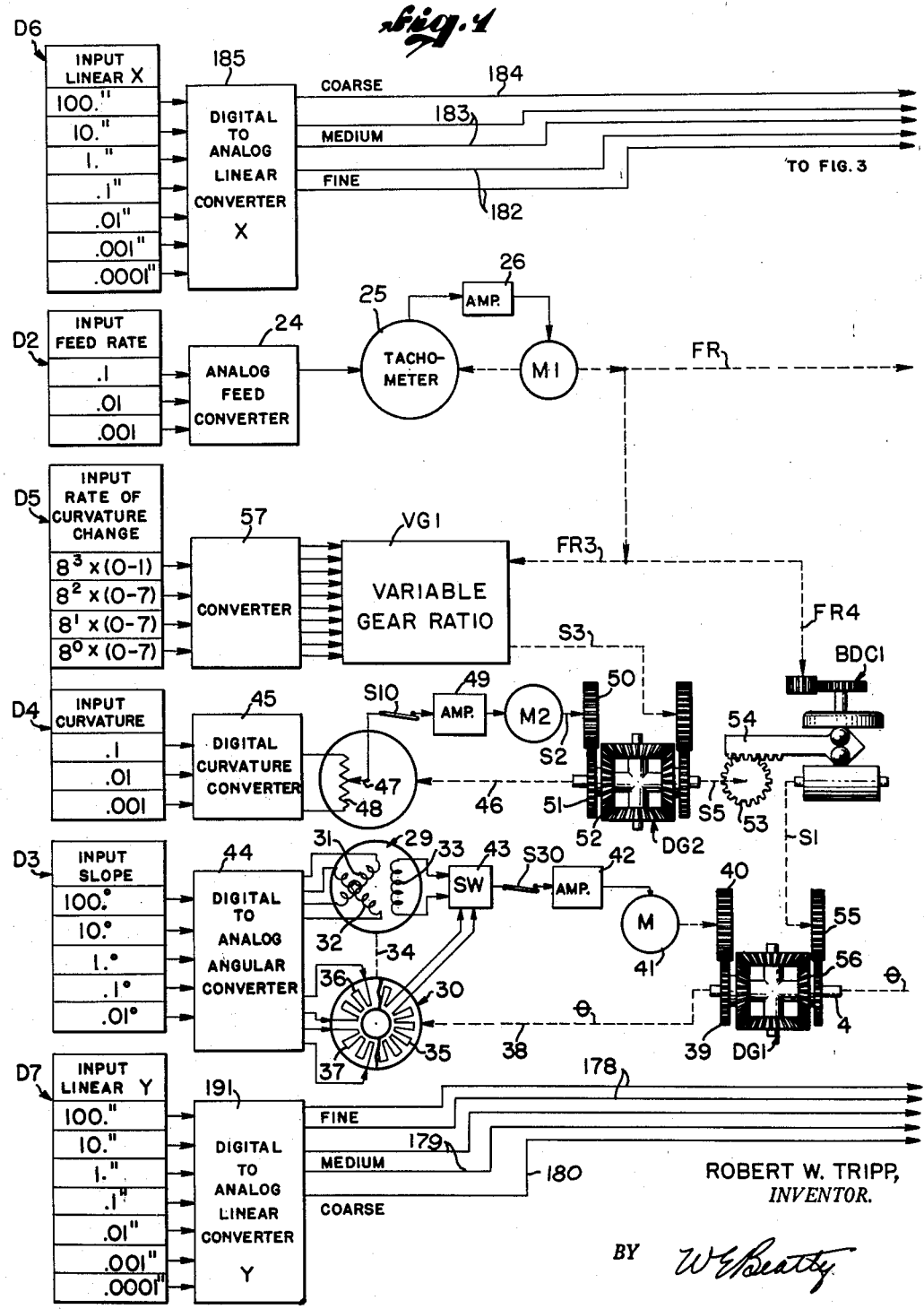

FIG. 5 shows schematically a portion of the system receiving the feed rate values of $x$ and $y$ from FIG. 3 and $\theta$ from FIG. 1 with a position checker therefor and supplying corrected values of $x$ and $y$ via FIG. 7 to FIG. 9.

Figure 10:
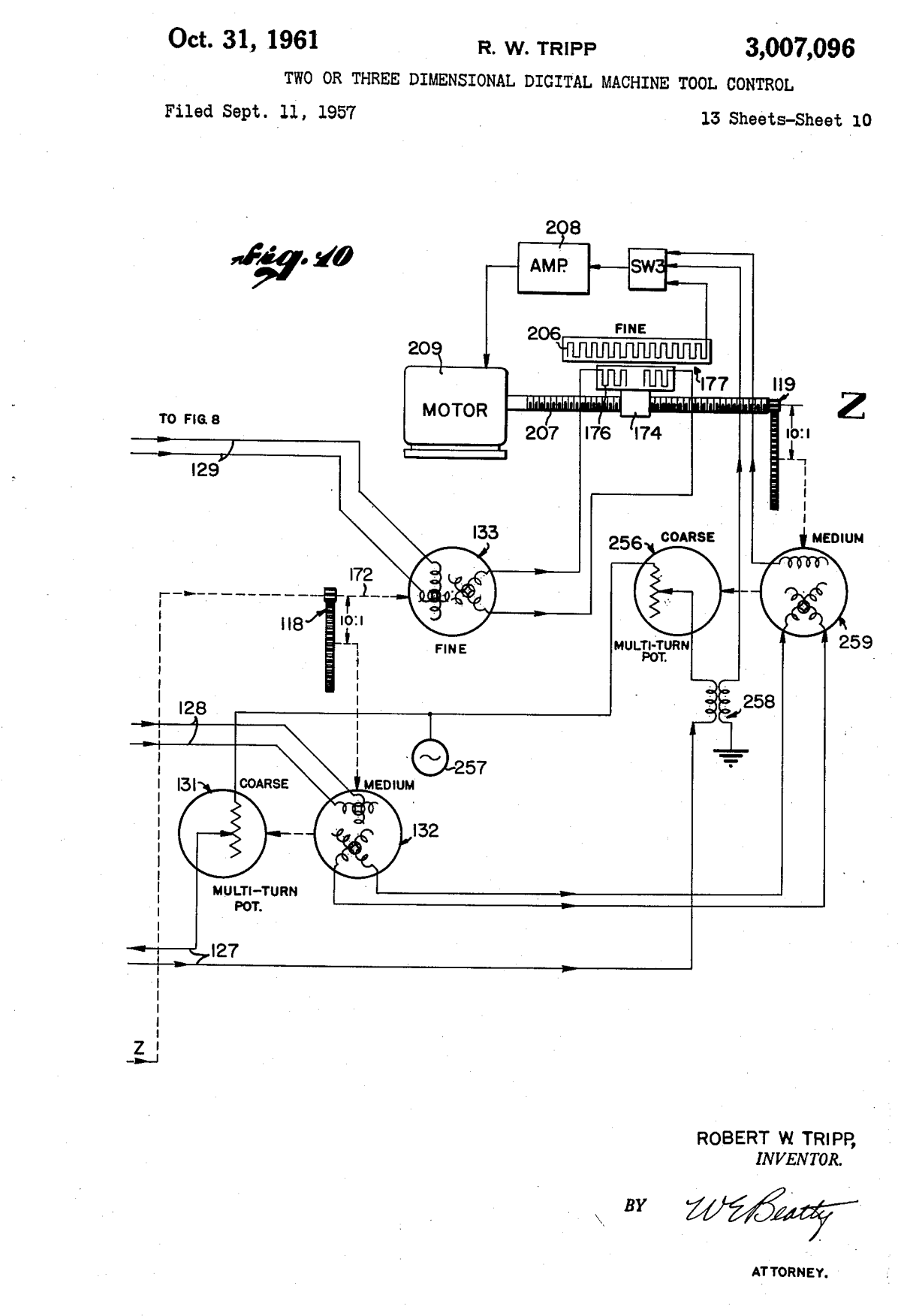

FIG. 6 shows a position checker receiving values of the feed rate Z from FIG. 4 and values of $\phi$ via FIG. 4 from FIG. 2, FIG. 6 supplying the position checked values of Z via FIG. 8 to FIG. 10.

FIG. 7 shows a tool radius correction for $x$ and $y$ supplied to the system of FIG. 9 for combination with the tool radius correction of FIG. 5.

FIG. 8 schematically shows the tool radius correction portion of the system receiving values of $\phi$ via FIGS. 6 and 4 from FIG. 2 and supplying tool radius correction to FIG. 10.

FIG. 9 shows the servomotor control for the X and Y machine elements, the positions of which are thus determined by both the position checker and tool radius correction.

FIG. 10 schematically shows the Z machine element which is also controlled in accordance with the tool radius correction and with the position checked value of Z via FIG. 8 from FIG. 6.

Figure 11:
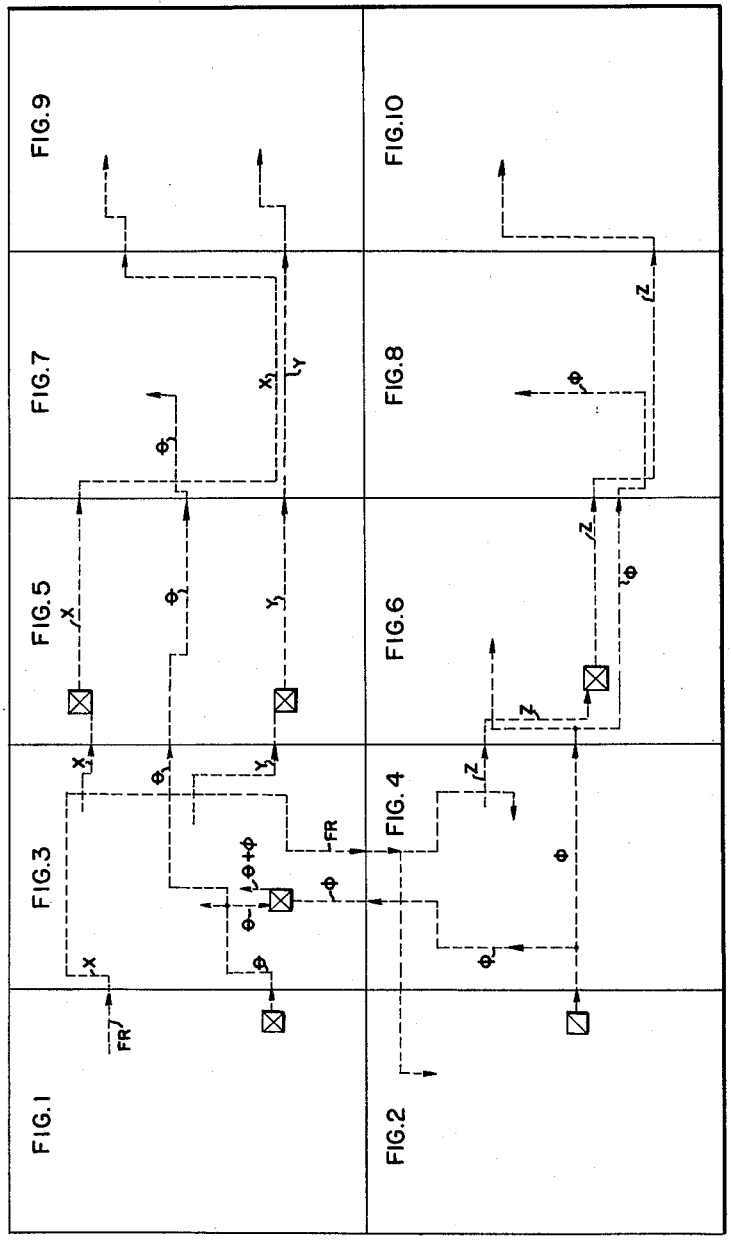

FIG. 11 is a key sheet showing how the odd numbered FIGURES 1 to 9 fit in sequence with the even numbered FIGURES 2 to 10 in sequence there below to provide a 2-dimensional and 3-dimensional digital machine tool control according to the present invention.

FIG. 12 is a perspective 3-dimensional coordinate view and illustrates the computation of the error of the tool or carriage position in the 3-dimensional case and for which four resolvers may be employed as described in connection with schematic showings in FIGS. 14, 16, 17, 18 and 22.

FIGS. 13, 15 and 19 are schematic views useful in connection with FIG. 12.

Figure 20:
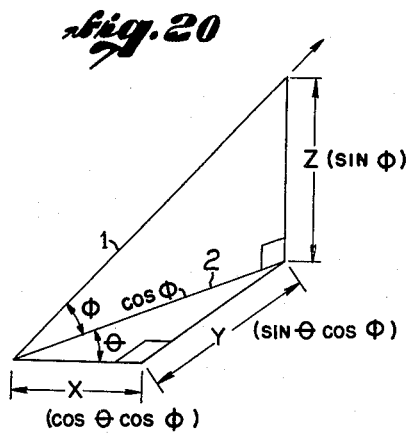

FIG. 20 is a schematic diagram showing the tool path 1, its component in the X, Y plane and its angles $\theta$ and $\phi$ and its components on the X, Y and Z axes.

Figure 21:
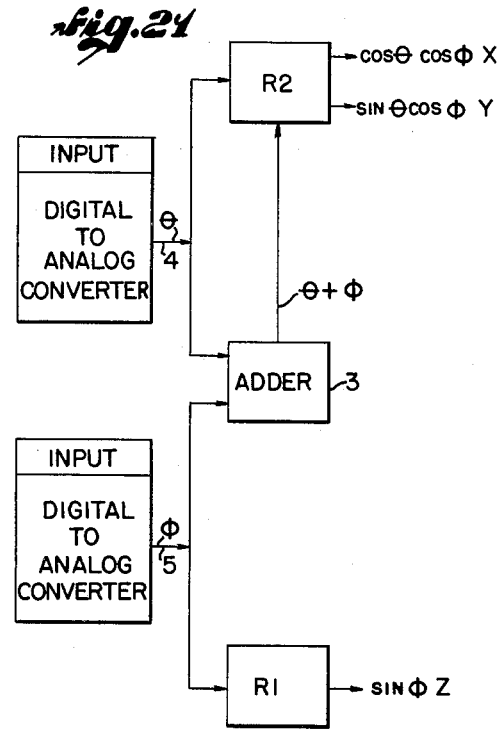

FIG. 21 is a schematic block diagram illustrating the mathematical operations performed on the shaft rotation outputs of FIGS. 1 and 2, with the use of the component solver and adder of FIG. 3 for producing shaft outputs characteristic of the X, Y and Z components of the tool path.

Referring in detail to the drawings, as shown in FIG. 20, the tool path 1 is illustrated with reference to the three dimensional coordinate axes X, Y and Z, the angle $\theta$ representing the angle between the X axis and the tool path component 2 in the X, Y plane while the angle $\phi$ represents the angle that the tool path 1 is or extends above or out of the X, Y plane. The invention provides means for supplying analog values of $\theta$ and $\phi$ and means for resolving these angles into their components X, Y and Z according to the following formulae, the length of the tool path being taken as unity.

$$X = \cos \theta \cos \phi$$
$$Y = \sin \theta \cos \phi$$
$$Z = \sin \phi$$

The term $\sin \phi$ or Z is solved with the resolver R1 in FIGS. 4 and 21, while the terms $\cos \theta \cos \phi$ and $\sin \theta \cos \phi$ are solved by the component solver R2 in FIGS. 3 and 21. As shown in FIG. 21, the component solver R2 has as inputs the value $\theta$ and also the value $\theta + \phi$ obtained from the adder 3, FIGS. 3 and 21, which has both $\theta$ and $\phi$ as inputs.

By integrating the feed rate with values proportional to the components above described and shown in FIG. 20, the tool or other driven element is caused to follow a path in space in accordance with digital input data appropriate to its angles $\theta$ and $\phi$. The X and Y machine drives are indicated in FIG. 9 while the Z machine drive is indicated in FIG. 10, as will be described in detail later.

The above general statement of the matter is given at this point in order to describe the invention in general terms, and in connection therewith the following general description may also be considered.

The present case describes and claims three basic parts as follows:

(1) The command unit of FIG. 1 which determines continuously varying values of angle $\theta$ at shaft 4 from decimal, digital inputs D3 of slope, D4 of curvature, D5 of rate of change of curvature and D2 of feed rate.

(2) The resolving unit which operates on the values of angle $\theta$ and values of the feed rate to determine the X and Y coordinates in terms of the angular position of the shaft corresponding to shaft 4 in FIG. 1.

(3) The driving unit similar to present FIG. 9, which converts the X and Y shaft instructions to coarse, medium and fine electrical signals which in turn cause the machine elements to servo to the correct positions.

Generally speaking, the two-dimensional case has been extended to three dimensions as disclosed and claimed herein in connection with tool radius correction and position checking by making the following improvements:

(1) *Command unit.*—The command unit includes not only the command unit of FIG. 1 as described above for obtaining continuously varying values of angle $\theta$ at shaft 4, but it also includes, as shown in FIG. 2, decimal digital values and inputs D8 of slope, D9 of curvature and D10 of rate of curvature change and digital-to-analog converters controlled thereby for obtaining continuously varying values of angle $\phi$ at shaft 5.

(2) *Resolving unit.*—As above described in connection with FIG. 20, taking the length of the tool path as unity, its component $Z = \sin \phi$ is obtained with a conventional resolver R1 in FIGS. 4 and 21, while its other components $X = \cos \theta \cos \phi$ and $Y = \sin \theta \cos \phi$ are obtained with the resolver R2 in FIGS. 3 and 21. While a detailed description of resolver R2 will be given later, at this point it may be noted that this resolver R2 is a combination of three devices, namely:

a. A sine-cosine mechanism.

b. A planetary differential, see FIG. 3, in that the outer frame 6 is driven about its axis at angle $\theta$ (by pinion 7 which drives gear 8 on frame 6) frame 6 having a ring gear 9 having inwardly extending teeth 10 which mesh with the teeth 11 on planetary gear 12 which rotates about its axis and having a rotary support 13 at the outer end of a crank 14, the inner end of crank 14 being fixed to shaft 15 which rotates on the axis of frame 6 at angle $\theta + \phi$. The sum of $\theta$ and $\phi$ is the output of adder 3 in FIG. 21 and also FIG. 3, the latter showing this adder as a differential gear unit having inputs of $\theta$ from shaft 4 in FIG. 1 and $\phi$ from shaft 5 in FIG. 2.

c. A resolver, in that the sliders 16 and 17 have slots 18 and 19 of a Scotch yoke mechanism 20 applied to the crank pin 21 on gear 12 which rotates inside of ring gear 9, see FIG. 3.

(3) *Driving unit.*—In addition to the drives for the X and Y machine elements as in FIG. 9, the invention adds a drive for the Z machine element as in FIG. 10.

The invention will be described in further detail under the following headings, which represent various components of the machine control method and system; the command unit of FIG. 1, command unit of FIG. 2, component solver of FIG. 3, resolver of FIG. 4, the position checker for X and Y in FIG. 5 and for Z in FIG. 6, tool radius correction for X and Y in FIG. 7 and for Z in FIG. 8, the X and Y driving unit of FIG. 9 and the Z driving unit of FIG. 10. Before taking up these headings, a description will be given of the feed rate as this forms an input to FIGS. 1 to 4 inclusive.

FEED RATE

In FIG. 1, the input D2 supplies a decimal digital input of feed rate to the analog feed converter 24 which supplies a voltage as disclosed in S.N. 557,035, now Patent 2,875,390, for comparison with the voltage of tachometer 25 driven by feed rate motor M1. The servo indicated at 26 drives the motor M1 at such a rate that the difference between the voltage generated by the stepping switch conversion circuit, not shown, of the converter 24 and the tachometer 25 is essentially zero.

The feed rate motor M1 drives the feed rate shaft FR which in FIG. 1 is also an input indicated at FR3 to the variable gear ratio VG1, described later and also an input indicated at FR4 to the ball-disk-cylinder integrator BDC1, described later.

As shown in FIG. 3, the feed rate FR is also an input indicated at FR40 to the ball-disk-cylinder integrator, BDC2 and an input FR5 to the ball-disk-cylinder integrator BDC3, these integrators, as later described, being controlled by the sliders 16 and 17 of resolver R2, pertaining to the X and Y machine elements.

As shown in FIG. 4, the feed rate FR is an input FR6 to the ball-disk-cylinder integrator BDC4 in the output of resolver R1 and pertaining to the Z machine element.

As shown in FIG. 2, the feed rate FR is also an input FR7 to the variable gear ratio VG2 and an input FR8 to the ball-disk-cylinder integrator BDC5 later described.

COMMAND UNIT OF FIG. 1

In FIG. 1, the slope data D3 represents a decimal number in terms of angles, the curvature data D4 represents a decimal number in terms of the reciprocal of radius and the rate of curvature change data D5 represents a number in terms of speed, the speed number, as described and claimed in S.N. 557,035, now Patent 2,875,390 being in a system of numeration having a radix of 2 to the Nth power, where N is an integer here shown as 3, the system being octal.

The slope $\theta$ of the component 2 in the X, Y plane of the tool path 1, see FIG. 20, depends upon the ratio of the feed rates of the corresponding X and Y machine elements of FIG. 9. This ratio is established with a single datum of input information D3. This is accomplished by positioning the shaft 4 in FIG. 1 in accordance with the slope data D3 and by resolving the angular position of the feed rate resolver R2 in FIG. 3 into co-function controls in space quadrature, by operating the ball slides 27 and 28 of resolver R2 as inputs for the integrators BDC2 and BDC3 to establish the feed rates at shafts S11 and S12, FIG. 3, to establish the feed rate ratio on the X and Y axes.

The resolver shaft position $\theta$ is established from input information D3 of slope angles expressed in terms of angles on a decimal basis, a digital-to-analog converter 44 being provided to convert this input to the angular position θ of shaft 4 as described and claimed in co-pending application S.N. 540,748, filed October 17, 1955, by R. W. Tripp for "Automatic Shaft Control" now Patent 2,839,711, dated June 17, 1958, and assigned to the assignee of the present application, that application also disclosing and claiming a computer for computing the sine and cosine values of an angle equal to the sum of the angles represented by the digits in decimally related digital groups as indicated by the input D3. Said application also discloses producing the co-function sine and cosine values of the angle in coarse and fine increments, the coarse increment being supplied to the medium resolver 29, the fine increment to the Inductosyn 30. For example, the coarse increment of sine θ may be supplied to winding 31, the coarse increment of cosine θ to winding 32, windings 31 and 32 being in space quadrature and inductively related to the relatively rotatable winding 33 having a driving connection as indicated at 34 to the relatively rotatable winding 35 of Inductosyn 30. The fine increment of sine θ may be supplied to winding 36, the fine increment of cosine θ to winding 37. Windings 36 and 37 are inductively related to the relatively rotatable winding 35, the latter having a driving connection indicated at 38 to gear 39 of differential gear DG1. Gear 39 is connected by gear 40 to servo motor 41 having an amplifier 42 and controlled by a well known synchro switch 43. Motor 41 provides a shaft input to the differential gear DG1 and operates it to thereby operate resolver 29 and Inductosyn 30, in turn, to reduce to zero the error current in windings 33 and 35, whereby shaft 4 is driven to an angular position or to continuously varying positions in accordance with the data D3.

The circuit of motor 41 is controlled by a switch S30 later described.

As described in the above mentioned patent application S.N. 557,035, the ratio of the speed rates of the driven elements on the X and Y axes is changed, as required for a circular path, i.e., part or all of a circle, with a single datum of curvature input information D4. The input D4 thus provides curvature input information on a decimal basis in terms of curvature (reciprocal of radius) and the converter 45 converts this digital data to an analog value expressed as a shaft speed for addition to the position of shaft 4 as determined by the slope control D3.

As described and claimed in S.N. 557,035, the differential gear DG2 has a spider having an output shaft S5 driven at a speed equal to the sum of the speeds of shaft S3 from the rate of curvature change and the speed of shaft S2 driven by servo motor M2. The shaft S5 is a part of the spider and it has a driving connection 46 with the slider 47 of a potentiometer 48, the servo circuit including motor M2 and amplifier 49 driving the shaft S2 and hence gears 50 and 51 and gear 52 to a position or at a speed which reduces to zero the error current determined by the difference between the potentials established by the position of slider 47 and the curvature instruction from converter 45, as set up in the input D4.

S.N. 557,035 refers to page 12 of reprint from Machine Design, August 1945 through February 1946, entitled "Designing Computing Mechanisms" by Macon-Fry, for a description of the differential gear like DG1 and DG2 and elsewhere; also page 30 thereof for the well-known integrator like BDC1.

Switch S10 is similar in function to switch S30, to render its servo motor M2 inactive at certain times as described later.

The shaft thus in part at least is driven to a position or at a rate dependent upon the curvature instruction in the input D4. Shaft S5 operates gear 53 which operates the ball slide 54 to integrate the feed rate drive FR4 accordingly, the output S1 being added through gears 55 and 56 to the shaft 4 through the differential gear DG1.

As described and claimed in S.N. 557,035, the rate of change of curvature input data D5 is converted into analog form to provide a position or continuously varying speed values of shaft S3 which is added through differential gear DG2 to the position or speed of shaft S5, whereby the curvature instruction in shaft S5 is thus modified in accordance with the rate of curvature change instruction in the input D5. Application S.N. 557,035 points out certain advantages in having the input D5 in octal form as indicated with its conversion by converter 57 to binary form, to operate gears VG1 in different combinations to change the speed of the feed rate input FR3 into the speed of the output shaft S3 in accordance with the instructions set up in the input D5.

Hence the θ shaft 4 in FIG. 1 is controlled by the combined effect of the instructions in all of the inputs D3, D4 and D5, whereby the combined effect of all of these instructions may be resolved into co-function space quadrature feed rates for the X and Y drives.

Application S.N. 557,035 refers to pages 31 to 33 of the above publication "Designing Computing Mechanism" for a description of the principle of operation of the binary gear device VG1, although said application discloses and claims an improved construction. Said application also refers to Equation 7, page 8, Vol. 27, Radiation Lab. Series, published 1948 by McGraw-Hill Book Co., said equation pertaining to the speed of the output shaft of a spur gear cell in relation to the spider speed and the input shaft speed, a number of such cells being useful for operation by the binary instructions supplied to the variable gear ratio VG1.

COMMAND UNIT OF FIG. 2

Referring to FIG. 2, the circuit here shown is similar to the circuit in FIG. 1, the slope input D8, the curvature input D9 and the rate of curvature change D10 corresponding to the inputs D3, D4 and D5 respectively. The circuits and devices controlled by the inputs D8, D9 and D10 are also similar to the corresponding items in FIG. 1, with this main difference, that the inputs D8, D9 and D10 have values appropriate to positioning or driving the shaft 5 at the angle φ, appropriate to the desired motion of the machine in the Z direction, see FIGS. 10, 20 and 21.

Accordingly, the slope data in the input D8 is converted by converter 60 into coarse and fine increments of sine and cosine values by the coarse resolver 61 and the Inductosyn 62 which are driven by the servo motor 63, under control of synchro switch 64, to reduce the error current to zero, as previously described, to thereby drive shaft 5 through differential gear DG3 as called for by the slope input D8. The position or rate of shaft 5 is varied by the curvature input D9 acting through the digital-to-analog converter 68 and servo motor 65, differential gear DG4, shaft 66, ball slide 67 to integrate the feed rate FR8 and provide a shaft output S6 which is added through differential gear DG3 to the shaft 5. Also, the curvature shaft output S6 is modified in accordance with the rate of curvature change instruction in the input D10 through the addition of the shaft output S7, from variable gear ratio VG2, through differential gear DG4, to shaft 66 and the input of ball slide 67 to the integrator BDC5. The input D10 controls the digital-to-analog converter 69 which controls the variable gear ratio VG2 having the feed rate input FR7.

The servo circuits of motors 63 and 65 in FIG. 2 are controlled by switches S8 and S9, as in FIG. 1, and later described.

The φ output of shaft 5 is thus in accordance with the combined instructions in the inputs D8, D9 and D10.

COMPONENT SOLVER OF FIG. 3

The terms cos θ cos φ (X) and sin θ cos φ (Y) are solved by the component solver R2 in FIG. 3.

The planetary gear 12 is so mounted that it will rotate about its center 23 while being driven by shaft 15 through crank 14. Gear 12 meshes with ring gear 9, its pitch diameter being equal to ½ that of ring gear 9. Pin 21 is integral with gear 12, and is located on the pitch line. It drives the Scotch yoke having yokes or sliders 16 and 17. Ring gear 9 is itself driven about its axis 22 by pinion 7 acting through gear 8. The distance of pin 21 from axis 22 will be referred to as R.

The component solver R2 is a combination of the following three devices.

(1) As a planetary differential, if the center 23 of gear 12 is rotated about axis 22 by angle $\alpha$ and if ring gear 9 is rotated about its axis 22 by angle $\theta$, then planetary gear 12 will rotate about its own center 23 by angle $\alpha - \theta$.

(2) With ring gear 9 fixed, as planetary gear 12 is rotated about its center 23 by an angle $\phi$, pin 21 will proceed in a straight line across the diameter of ring gear 9 in such a way that its distance R from axis 22 is proportional to cos $\phi$. It can be seen that with ring gear 9 free to rotate, this proportionality still holds, with respect to ring gear 9.

(3) As a resolver, if ring gear 9 is rotated about its axis 22 at an angle $\theta$, then pin 21 will cause yokes or sliders 16 and 17 to move proportionately to R cos $\theta$ and R sin $\theta$.

By combining the above three modes, output yokes or sliders 16 and 17 can be caused to move proportionally to sin $\theta$ cos $\phi$, and cos $\theta$ cos $\phi$, as follows:

(a) Revolve center 23 about axis 22 through an angle $\theta+\phi$, by turning shaft 15. Shaft 15 is operated by the sum of angle $\theta$ from FIG. 1 and $\phi$ from FIG. 2, these values being added in the differential gear or adder 3 which supplies the sum $\theta+\phi$ as an output for shaft 15.

(b) Rotate ring gear 9 through angle $\theta$, by turning gear 7, angle $\theta$ from FIG. 1 being an input to gear 7.

(c) By differential action, planetary gear 12 will rotate about its center 23 at an angle $\alpha-\theta$, where $\alpha=\theta+\phi$, namely at an angle $\theta+\phi-\theta$ or angle $\phi$.

Therefore, pin 21 will move along a diameter of ring gear 9 proportional to cos $\phi$, or $R = \cos \phi$.

But ring gear 9 has been rotated through angle $\theta$. Therefore, by resolver action, yokes or sliders 16 and 17 move amounts proportional to R sin $\theta$ and R cos $\theta$, or sin $\theta$ cos $\phi$, and cos $\theta$ cos $\phi$, respectively, since $R = \cos \phi$.

As above described, the ball slides 27 and 28 are actuated by the slides 16 and 17 respectively to integrate the feed rate FR40 and FR5 respectively supplied to the respective integrators BDC2 and BDC3, whereby the shafts S11 and S12 are driven at rates corresponding to the X and Y components of the tool path.

RESOLVER OF FIG. 4

As above described, the angle $\phi$ instruction of shaft 5 from FIG. 2 is resolved by resolver R1 and its Scotch yoke slider 70 into a linear movement proportional to sin $\phi$, slider 70 actuating the ball slide 71 of the integrator BDC4 which has the feed rate input FR6, to provide a shaft output S13 carrying a feed rate instruction in accordance with the Z component of the tool path.

POSITION CHECKER FOR X AND Y

A description will now be given of the determination of the machining errors of a machine tool control system. The two dimensional case is disclosed and claimed in the present case which uses resolvers in the usual unilateral manner. The bi-lateral application, with a reduction in the number of resolvers required, is disclosed and claimed in Case 7, S.N. 595,702 filed July 3, 1956 by Robert W. Tripp for Bilateral Electrical Resolver System, now Patent 2,866,597, dated December 30, 1958.

FIGS. 5 and 6 show the portion of the system for position checking, the checking for X and Y being shown in FIG. 5 and for Z in FIG. 6. Referring to FIG. 12, the point O (X, Y, Z) is the present carriage position with respect to the X, Y and Z axes. The point O (X, Y, Z), may be taken as the origin, or its position may be identified by coordinates with reference to an origin located elsewhere. The slope of the cut has the slope angle $\theta$ to the X axis, and it has the slope $\phi$ out of the X, Y plane. The slope of the cut is extended to point $\Delta S'$ on the vector S'. If the tool were to follow the extended slope $\Delta S'$ it would miss the assumed check point $P_2$ ($X_2$, $Y_2$, $Z_2$) on the desired generated curve. The invention provides for measuring the amount by which the tool would miss the check point $P_2$ ($X_2$, $Y_2$, $Z_2$), with provisions for correcting this error.

It will be seen that in the two dimensional case, somewhat as appears in FIG. 13, the points O and $P_2$ identify a vector having the component $\Delta s$ along the extended slope and having the component "e" at right angles to that slope. When the value $\Delta s$ is zero, the points O and $P_2$ coincide and when the value "e" is small enough such as few hundredths of an inch, for example .02 to .00 inch, this event can be used to check the slope control and the curvature control. The orthogonal components of the vector between O and $P_2$ are known for the following reasons. A value proportional to the X ordinate of the present workpoint O is represented by the X shaft output (shaft 122) from the differential gear DG5, acquiring this instruction from shaft S11 and the command data from the inputs D2 to D5. The X ordinate of the check point $P_2$ is given in fine, medium and coarse increments by electrical signals in the lines 182, 183 and 184 respectively from the digital-to-analog linear converter 185 for the linear input data pertinent to X and indicated at D6, see FIG. 1. The fine signal in line 182 is fed to the quadrature windings 186 of the synchro resolver R3 and its output 187 contains a signal proportional to the difference between its electrical input in line 182 and its X shaft input, this signal being proportional to the difference between the X coordinate of point $P_2$ and the X coordinate of point O, or $\Delta x$ as shown in FIG. 13. The medium resolver R4 and the coarse potentiometer 188 are also driven in accordance with the X shaft input 122, but through the 10-to-1 gearing 189, as in the case of gearing 117 and 166 for X and gearing 124 (corresponding to 189), 123 and 175 for Y, in FIGS. 5 and 9 and also gearing 125 (corresponding to 189), 118 and 119 for Z in FIGS. 6 and 10. In a similar way, the output of the medium resolver R4 and the coarse potentiometer 188 also contain the $\Delta x$ signal (the difference between the X coordinates of the points $P_2$ and O) in medium and coarse increments, these error signals and the fine error signal from R4 being supplied to the switch SW4 in circuit with one of the windings 190 of a four winding synchro resolver R6, see FIG. 5.

In a similar way, see FIG. 1, the Y coordinate of the check point $P_2$, FIG. 12, is derived from the linear input D7, FIG. 1, having a digital-to-analog converter 191 which supplies the fine, medium and coarse increments of the $\Delta y$ primary check data over the lines 178, 179 and 180, respectively as indicated to the fine resolver R7, FIG. 5, the medium resolver R8 and the coarse potentiometer 192. The fine signal in line 178 is fed to the quadrature windings 167 of the synchro resolver R7, FIG. 5, and its output 168 contains a signal proportional to the difference between its electrical input in line 178 (characteristic of the check point) and its Y shaft input (characteristic of the present tool position) of shaft 169 from differential gear DG6, this signal being proportional to the difference between the Y coordinate of point $P_2$ and the Y coordinate of point O or $\Delta y$ as shown in FIG. 13. The medium resolver R8, FIG. 5, and the coarse potentiometer 192 are also driven in accordance with the Y shaft input 169 but through the 10-to-1 gearing 124. In a similar way, the output of medium resolver R8 and the coarse potentiometer 192 also contain the $\Delta y$ signal (the difference between the Y coordinates of the points $P_2$ and O) in medium and coarse increments, these error signals and the fine error signal from R7 being supplied to the switch SW5 in circuit with the other input winding 193 of synchro resolver R6, see FIG. 5.

$\Delta x$ and $\Delta y$ are constantly obtained and fed into the resolver R6 in the manner shown in FIG. 5. Resolvers R6 and R9 are set at the angle $\theta$ by shaft 4. Resolver R6 has an output "$e$" which is an input to resolver R9, and in the two dimensional case, resolver R9 has outputs which are the correction values. Its outputs are here shown as $\Delta\Delta x$ and $\Delta\Delta y$, for the three dimensional case considered a little later. As described later, when the distance $\Delta s$ in the output of resolver R6 has decreased to a certain preselected value (a small fraction of the distance between two successive points such as O and $P_2$), a switch closes which allows the correction to start. The correction values are added to the computed X and Y values respectively. The vector sum of these values is used to drive the carriage of the machine. When the carriage or tool position has been brought back to the required curve, the correction values in the output of resolver R9 will become zero. The distance between two successive points on the curve such as O and $P_2$ is limited to a value whereby the machine and computer combination will not be in error by values that exceed the allowable machining tolerances.

The three dimensional case will now be considered, first with regard to the solution and then with regard to the apparatus involved for axis Z, in addition to the apparatus described above for X and Y. FIG. 12 illustrates the problem. Point O is taken as the present position of the machine carriage. Its coordinates are X, Y, Z. This point is equivalent to point O for the two-dimensional case. The relative motion between the carriage and the tool is indicated by the slant line S′ whose direction is defined by the angle $\theta$ from the projection of this line on the X, Y plane to the X axis and the angle $\phi$ to the X, Y plane. The carriage should proceed toward the point $P_2$ but as it approaches $P_2$ its position is displaced from $P_2$ by the three components $\Delta\Delta x$, $\Delta\Delta y$, $\Delta\Delta z$. These are the errors to be found and corrected. The net resultant of these three mutually perpendicular errors is shown as $e'$. It is (by definition) the shortest distance from point $P_2$ to the line S′ extending from point $P_2$ in the direction determined by the angles $\theta$ and $\phi$. More specifically, the vector $e'$ is the miss distance from the point $P_2$ if the carriage continues to travel without correction, along its present path defined by the angles $\theta$ and $\phi$. When the coordinate errors $\Delta\Delta x$, $\Delta\Delta y$, $\Delta\Delta z$ have been found, the carriage position can then be corrected as it approaches the point $P_2$. These errors will be obtained in the following analysis:

Project a plan view (X, Y plane) of FIG. 12.

The coordinates $\Delta x$, $\Delta y$ are measured in coordinate system 1 (see FIG. 13). Rotate this system about the Z axis through the angle $\theta$. The new coordinates of the point $P_2$ in this new rotated system are $\Delta s$ and $e$, wherein $e$ is the projection in the X, Y plane of the 3-D resultant error $e'$. These values are obtained with resolver R6 (see FIG. 14).

Now looking at the $y'$ plane, it is seen that the point $P_2$ is represented by the coordinates $\Delta z$ and $\Delta s$ with respect to coordinate system 2.

Rotating this system through the angle $\phi$ results in coordinate system 3 (see FIG. 15). The point $P_2$ in this system is represented by the coordinates $\Delta\Delta z'$ and $\Delta S'$. The coordinate $\Delta S'$ is the magnitude of the vector S′ shown in FIG. 12. The solution for these coordinates can be accomplished as shown in FIG. 16. The vector $\Delta\Delta z'$ has components in all three mutually perpendicular directions of the original system X, Y, Z of FIG. 12. The value $\Delta\Delta z$ of FIG. 15 is one of the three error values to be found. It can be seen as a component of $\Delta\Delta z'$. The other component of $\Delta\Delta z'$ in FIG. 15 is in the X, Y plane and is shown in the figure as the vector $l$. This vector is in the plane of FIG. 19 and is perpendicular to the vector $e$.

The coordinates $\Delta\Delta z$ and $l$ are obtained as shown in FIG. 17.

The resolver computations shown in FIG. 18 will obtain the coordinates $\Delta\Delta x$ and $\Delta\Delta y$.

Figure 22:
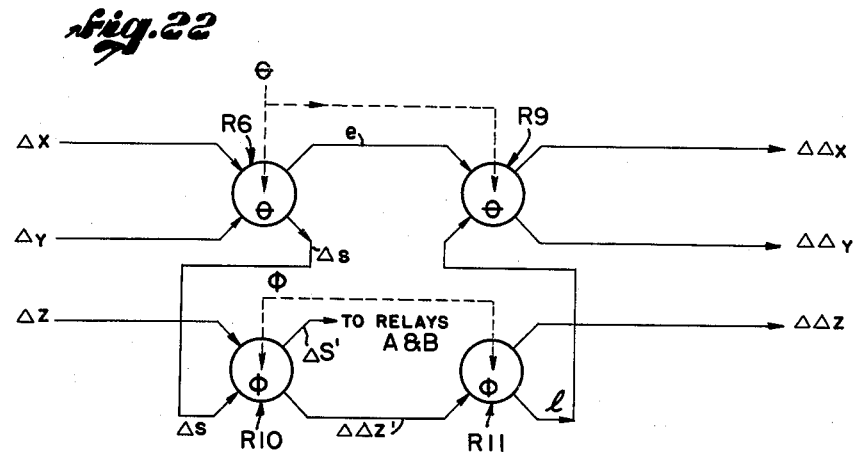

By combining FIGS. 14, 16, 17 and 18, the entire solution is presented in FIG. 22. In FIGS. 5 and 22, with resolvers R6 and R9 set at the angle $\theta$ as shown, with resolvers R10 and R11 set at the angle $\phi$, with $\Delta x$ and $\Delta y$ inputs to resolver R6 and with $\Delta z$ and $\Delta s$ inputs to resolver R10, resolvers R9 and R11 supply the values $\Delta\Delta x$, $\Delta\Delta y$ and $\Delta\Delta z$.

The value $\Delta S'$ in the output of resolver 10 is used in the same manner as is $\Delta s$ in the two dimensional case. That is, where its value has decreased to a preselected value the error corrections start taking place.

POSITION CHECKER FOR Z

In a manner somewhat similar to that described in connection with the input data pertinent to X and Y, the orthogonal components of the vector between O and $P_2$ are also known with reference to the Z axis. The Z ordinate of the check point $P_2$ is derived from the linear input D11, FIG. 2, having a digital-to-analog converter 59 which supplies the fine, medium and coarse increments of the $\Delta z$ primary check data over the lines 194, 195 and 196 respectively. The fine signal in line 194 is fed to the quadrature windings 197 of the synchro resolver R12 and its output 171 contains a signal proportional to the difference between its electrical input in line 194 (characteristic of the check point) and its Z shaft input (characteristic of the present tool position) of shaft 172 from differential gear DG7, this signal being proportional to the difference between the Z coordinate of point $P_2$ and the Z coordinate of point O or $\Delta z$ as shown in FIG. 15. The medium resolver R13 and the coarse potentiometer 170 are also driven in accordance with the Z shaft input 172 but through the 10-to-1 gearing 125. In a similar way, see FIG. 6, the output of medium resolver R13 and the coarse potentiometer 170 also contain the $\Delta z$ signal (the difference between the Z ordinates of the points $P_2$ and O) in medium and coarse increments, these error signals and the fine error signal from R12 being supplied to the switch SW6 in circuit with the input winding 173 of synchro resolver R10.

It will be apparent then that as shown in FIGS. 5 and 6, resolver R6 has inputs of $\Delta x$ and $\Delta y$, and outputs of $e$ and $\Delta s$. Resolver R10 has inputs of $\Delta s$ and $\Delta z$ and outputs of $\Delta\Delta z'$ and $\Delta S'$. Resolver R11 has an input of $\Delta\Delta z'$ and outputs of $\Delta\Delta z$ and $l$, the latter and $e$ being inputs for resolver R9 which has as outputs $\Delta\Delta x$ and $\Delta\Delta y$. Also, resolvers R6 and R9 are set at angle $\theta$ by shaft 4 from differential gear DG1 in FIG. 1, resolvers R10 and R11 being set at the angle $\phi$ by shaft 5 of differential gear DG3 in FIG. 2.

The value $\Delta S'$ in the output of resolver R10, FIG. 6 is supplied to relay A and also to relay B. Relay A has a contact 72 in circuit with the $\Delta\Delta z$ output of resolver R11 and with amplifier 73 and motor M3, having a shaft 74 whereby the instruction of $\Delta z$ in shaft S13 is added by differential gear DG7 to the instruction in shaft 74 to form the $z$ shaft drive 172. Relay A has a contact 75 in circuit with the $\Delta\Delta y$ output of resolver R9 and with amplifier 76 and motor M4 having a shaft 77 whereby the instruction of $\Delta y$ in shaft S12 is added by differential gear DG6 to the instruction in shaft 77 to form the $y$ shaft drive 169. Relay A also has a contact 78 in circuit with the $\Delta\Delta x$ output of resolver R9 and with amplifier 79 and motor M5 having a shaft 80 whereby the instruction of $\Delta x$ in shaft S11 is added by differential gear DG5 to the instruction of shaft 80 to form the $x$ shaft drive 122, see FIG. 5.

As shown in FIG. 1, relay A of FIG. 5 also has a switch contact S10 which when open, opens the circuit of servo motor M2, and when closed, closes this circuit.

Also, relay A of FIG. 5 has a similar switch contact S30 in circuit with servo motor 41. The servo motors M2 and 41 of FIG. 1 operate the $\theta$ shaft 4, pertaining to X and Y. The $\phi$ shaft 5 of FIG. 2, pertaining to Z, is operated by servo motors 63 and 65, and similarly relay A of FIG. 5 has switch contacts S8 and S9 respectively controlling these servo motors. The contacts S10 and S30 of FIG. 1, also contacts S8 and S9 of FIG. 2, also contacts 75 and 78 of FIG. 5 and contact 72 of FIG. 6 are all open until the current through relay A drops to a value representing that the value ΔS' FIGS. 12 and 15 is small, such as from .020 to .000 inch, which means that the present work point is close to the check point. As above described, when relay A operates to close its contacts S10, S30, S8 and S9, the slope and curvature controls for X and Y in FIG. 1 and for Z in FIG. 2 are operative to communicate the instructions in their respective input data D3 and D4, also D8 and D9 to their respective driven shafts 4, S5, 5 and 66, as explained above.

As shown in FIG. 6, relay B also has an input of ΔS', and it has a contact 81 which closes the 24 v. circuit indicated through a card-read relay, not shown, to advance the card or the like to the next position so that the reader, also not shown, will read the subsequent bit of input data in all of the inputs D2 to D11, when the current in relay B is zero.

TOOL RADIUS CORRECTION FOR X AND Y IN FIG. 7 AND FOR Z IN FIG. 8

As described and claimed in Case 241g referred to above, the tool radius is resolved into its components along the X, Y and Z axes for summation (addition or subtraction) with the corresponding components of the corrected tool path. As shown in FIG. 8, the tool radius TR is a separate and adjustable input. The tool radius corrections are electrical in nature and are added to the respective X, Y and Z shaft instructions in shafts 122 and 169 of FIG. 5 and 172 of FIG. 6 respectively.

As appears from FIG. 20, the tool radius has coordinate components of which the X component is proportional to the $\cos \theta \cos \phi$, the Y component being proportional to $\sin \theta \cos \phi$ and the Z component being proportional to $\sin \phi$. These values are obtained with the resolvers R14 and R15 of FIGS. 7 and 8.

The invention provides the checked or corrected X, Y and Z shaft instructions in coarse, medium and fine increments, as will be described in connection with FIGS. 9 and 10 and the invention also provides the electrical tool radius corrections in a component along each of those axes, these components being referred to as ΔRx, ΔRy and ΔRz respectively. These components are provided in coarse, medium and fine increments for servoing the X, Y and Z elements of FIGS. 9 and 10, in accordance with the command instructions, as checked or corrected, and also as modified in accordance with the tool radius corrections.

The value of the tool radius TR ordinarily changes only when the cutter is changed on the machine tool so that it is within the scope of the invention to provide for the setting of TR by manual displacement of the pin 82 of resolver R15 in FIG. 8 with respect to the axis of its shaft 161. The embodiment of the invention illustrated includes means whereby the value of TR as well as the value of $\theta$ and $\phi$ in the computers can be automatically and continuously varied. Such manual means for varying the value of TR may take the form of a crank or handle 88 in FIG. 8 for operating the shaft 89 which operates the coarse potentiometer 113 and the fine resolver 134 which operate as transmitters for their respective coarse potentiometer receiver 135 and Inductosyn fine data element 149. Servomotor 86 drives the coarse element 135 and the screw 90. Screw 90 drives the Inductosyn slider 91 until the error signals from the coarse and fine elements 135 and 149 reach a null, as in usual servo practice.

In FIG. 8, pin 82 is on a carriage not shown driven by screw 90. The fine position data element coupled to this carriage for indication of the position of pin 82 is a precision linear position measuring transformer (Inductosyn), generally indicated at 149. This transformer includes a scale member 92 fastened to table 160 and a slider member 91 fastened to the carriage not shown. The scale member 92 includes a continuous multipolar winding in which uniformly spaced conductors are connected in series and positioned to extend transversely of the relative direction of motion of the two transformer members as established by the lead screw 90. The transformer member 91 includes two basically similar multipolar windings, positioned to each other in space quadrature of the pole cycle comprising two adjacent conductors on the member 92. A reference source of voltage is shown at 93 for coarse element 135 and at 94 for elements 113 and 134. The swingers of elements 135 and 113 are connected in opposition through the primary winding 95 of a transformer having a secondary winding 96 which supplies the coarse error signal to the switch 97 which also receives the fine error signal in line 98 from the element 92. The error currents are controlled by switch 97 as well known and are amplified by amplifier 99 and fed to motor 86.

Also, shaft 89 which adjusts the radial position of pin 82 may be operated automatically and continuously by a tool radius data input indicated at 100, FIG. 8, which may for example include means for converting input data into a shaft rotation as shown and described in connection with the digital-to-analog slope input D8 and converter 60 of FIG. 2.

Referring to FIG. 8, the motor 86 is controlled to drive pin 82 to positions such that the distance between the axis of pin 82 and of shaft 161 accurately represents the cutter radius TR, and the shaft 161, indicated as an extension of shaft 5 is driven by the inputs to differential gear DG3 in FIG. 2 to a position such that the angular position of pin 82 about the axis of shaft 161 accurately represents, with reference to a prime direction, the angle $\phi$. In like manner, the pin 85 in FIG. 7 is driven by an output from resolver R15 to a position such that the distance between the axis of pin 85 and the axis of shaft 87, here indicated as an extension of shaft 4 in FIG. 1, corresponds to $TR \cos \phi$. The $\theta$ shaft 87 is driven to a position determined by the inputs to differential gear DG1 in FIG. 1.

From the value of TR and $\phi$ put into the computer of FIG. 8, the correction ΔRz is developed, and from the values of $TR \cos \phi$ and $\theta$ put into the computer of FIG. 7, the corrections ΔRx and ΔRy are developed, with a high degree of accuracy. Circuits are provided for connecting FIG. 8 to FIG. 10 and for connecting FIG. 7 to FIG. 9 to combine the programmed X, Y and Z values from the inputs D3 to D11, FIGS. 1 and 2 as manifested in rotations of shafts 4 and 5 as corrected by the values ΔΔx, ΔΔy and ΔΔz so that the X, Y, and Z machine elements are operated to position the center of the machine tool with respect to the workpiece according to the values $X+\Delta\Delta x+\Delta Rx$, $Y+\Delta\Delta y+\Delta Ry$ and $Z+\Delta\Delta z+\Delta Rz$. It will be understood that whether the tool radius correction is added or subtracted depends on the relative position of the cutter with respect to the workpiece and the origin, appropriate choice of leads determining whether addition or subtraction is made. Shift from one to the other can be effected by the program.

For development of the correction ΔRz, the pin 82 (see FIG. 8) of the Scotch yoke device 163 engages two yokes 224 and 225 respectively constrained by bearing rods, not shown, to move perpendicularly to the axis of shaft 161 and to each other. The Scotch yoke device 225 in FIG. 8 and the similar Scotch yoke device 83 in FIG. 7 are disclosed in the above mentioned Case 5. If when the angle $\phi$ in the program of the part to be cut is zero, the pin 82 and the axis of shaft 161 are spread apart the distance TR, and if the table 160 thereafter rotates through the angle $\phi$, the yokes 224 and 225 will generate sine and cosine functions of the motion, that of yoke 224 being $TR \sin \phi$ and that of yoke 225 being $TR \cos \phi$. The direction of rotation of table 160 may be made to correspond to increase the values of the angle $\phi$.

Because the values $\Delta Rx$, $\Delta Ry$ and $\Delta Rz$ must be determined to a high degree of accuracy, which may be of the order of a thousandth or a ten thousandth of an inch, the $\theta$ and $\phi$ values for the angular positions of the tables 84 in FIG. 7 and 160 in FIG. 8 and the TR values for the radial position of pins 85 and 82 must be supplied with accuracies of the same order of magnitude, and means are provided to cause those elements to assume positions in accordance with the data thus supplied. To this end, the embodiment of FIGS. 7 and 8 includes both coarse and fine data indicating elements for indication of the $\theta$, $\phi$ and TR values actually assumed by the computers, i.e., the angular position of tables 84 and 160 and the radial positions of pins 85 and 82. Referring to FIG. 8, the TR value is indicated by the coarse transmitter 113, its coarse receiver 135 and by the fine transmitter 134 and its fine receiver 149. Referring to FIG. 2, the value of angle $\phi$ is indicated by the coarse data element 61 and by the fine data element 62.

The table 160 and its pin 82 are thus caused to assume positions in accordance with the values $\phi$ and TR supplied to the computer of FIG. 8 from the basic program sources where digital values of TR and $\phi$ are converted into analog values by means of the servo-mechanism described.

There have been thus far described the elements of the computer of FIG. 8 by means of which the yokes 224 and 225 are caused to assume positions accurately corresponding to $TR \sin \phi$ and $TR \cos \phi$. The positions $TR \sin \phi$ and $TR \cos \phi$ so established are then transformed according to the invention into electrical signals for addition by suitable apparatus, to be described in exemplary form by reference to FIG. 10, to the $z$ program values for the shape to be imparted to the workpiece by the machine tool being controlled. This transformation is effected by means of position data elements coupled between the yokes 224 and 225 and the frame of the Scotch yoke device 163.

Both coarse and fine elements are required for generation of electrical signals representative of $TR \sin \phi$ and $TR \cos \phi$ in view of the accuracy demanded in machine tool operation, and it may be advantageous to break down the electrical data of $TR \sin \phi$ and $TR \cos \phi$ into coarse, medium and fine stages. FIG. 7 diagrammatically indicates such an embodiment of the Scotch yoke device 83 acting as a computer with 3 such stages for each of the $x$ and $y$ positions, while FIG. 8 shows the Scotch yoke device 163 acting as a computer with 3 such stages for the $z$ position. For generation of coarse and medium position data elements of the yokes 224 and 225 has associated therewith gear mechanism diagrammatically indicated as including a rack 226 and pinion 227 for position $TR \cos \phi$ and rack 228 and pinion 229 for position $TR \sin \phi$. This angular motion is coupled to a potentiometer 164 for $TR \cos \phi$ and 164' for $TR \sin \phi$, the tap of which is shifted from one end to the other of the potentiometer winding not more than once for the full travel of the yoke to which it is coupled. In this way, unambiguous indications of the coarse increment of $TR \sin \phi$, $TR \cos \phi$ can be generated.

The linear movements of yokes 224 and 225 are broken down into coarse, medium and fine increments of electrical signals, for addition to the corresponding increments of the X, Y and Z command shaft instructions as follows. In FIG. 8, the reference source of voltage 116 supplies the potentiometer 164, the scale winding 230 of Inductosyn 231, the scale winding 232 of Inductosyn 120 acting as a fine transmitter, the primary winding 121 of transformer 233 and the winding 234 of the medium resolver 235.

Inductosyn 231 has quadrature slider windings 236 which are mounted on and slide with the yoke 225 to transmit over the line 126 an electrical signal proportional to $TR \cos \phi$. The potentiometer 164' transmits the coarse data component of $TR \sin \phi$ and this potentiometer as well as medium resolver 235 are connected by suitable drive to the pinion 229 as indicated. The coarse, medium and fine electrical signals representative of $TR \sin \phi$ are present in the output circuits 127, 128 and 129 of the coarse data element 164', the medium resolver 235 and the fine data Inductosyn 120 respectively. These values of $\Delta Rz$ are transmitted to the coarse, medium and fine transmitters 131, 132 and 133 in FIG. 10.

The coarse, medium and fine electrical values of $\Delta Rx$ and $\Delta Ry$ are computed in FIG. 7 with a computer which is quite similar to that shown in FIG. 8, one difference being that in FIG. 8 the computer 163 has an input of TR, while in FIG. 7 the similar computer 83 has an input of $TR \cos \phi$. This value of $TR \cos \phi$ is an instruction in the yoke 225 and it appears in coarse increments in the potentiometer 164, the slider 136 of which is driven by the pinion 227, and this instruction appears as a fine increment in the quadrature windings 236. Windings 236 constitute a slider and are fixed to yoke 225 and are movable relatively to the stationary winding 237 of Inductosyn 231. The error current from potentiometer 164 passes over line 137 to the primary 138 of transformer 139 which has a secondary winding 140 connected to synchro switch 141 which corresponds to switch 97 in FIG. 8. The error current in line 126 from the slider 236 is fed over line 126 to the quadrature windings 142 of Inductosyn 143, acting as a fine data receiver and having a stationary winding 144 connected to switch 141. The potentiometer 145 is a coarse receiver for the transmitter 164 and they are energized by a reference source of voltage 146. This reference source of voltage and others shown may be of the order of 10 kc., although other frequencies may be used. The servo motor 147 is coupled to the coarse receiver 145 and to the lead screw 148 which drives pin 85 as well as the scale quadrature windings 142. Switch 141 thus controls servo motor 147 to position pin 85 from the axis of shaft 87 by an amount corresponding to $TR \cos \phi$. The table 84 is controlled by shaft 87 to the angular position $\theta$, and hence the computer or resolver driven by the Scotch yoke device 83 resolves these instructions into a position of yoke 150 corresponding to $TR \cos \theta \cos \phi$ with yoke 151 in a position corresponding to $TR \sin \theta \cos \phi$. As explained in connection with FIG. 8, the motion or position of each of the yokes 150 and 151 is resolved into coarse, medium and fine increments. Accordingly, yoke 150 has the coarse, medium and fine data transmitters 152, 153 and 154 driven thereby which transmit their electrical signals over the lines 155, 156 and 157 respectively, the yoke 151 having similar coarse, medium and fine data transmitters driven thereby and indicated at 158, 159 and 165 respectively, which transmit their signals over the lines 198, 199 and 200 respectively.

The data elements above described for Scotch yoke 83 have a reference source of voltage 201.

The mechanical arrangement in the case of fine data elements like 120, 149 and 231 in FIG. 8, also 143, 154 and 165 in FIG. 7 is such that the windings of the two members of these Inductosyns, which conveniently lie on plane faces of insulating supports, are supported parallel to each other and at a close separation.

By a process which is the converse of that employed in position measuring transformer 143, from excitation of the single continuous windings 202 and 203 of Inductosyn 154 and 165 with an A.C. voltage from source 201, a suitable frequency for which may be of the order of 10 kilocycles, there will be developed in the quadrature windings 204 and 205 in-phase voltages whose amplitudes are related as the sine and cosine of the space phase between the two members of each Inductosyn or position measuring transformer within the pole cycle thereof, zero reference for this phase being that in which the voltage in one quadrature winding of each member is zero and the voltage in the other quadrature winding of that member is at a maximum. This is equivalent to saying that the voltages in the quadrature windings like 204 and 205, for example, are proportional to the sine and cosine of the angle through which a shaft would turn if geared to the linear motion of yokes 150 and 151 to make one revolution for travel of these yokes through the pole cycle of windings 202 and 203.

For each of transformers 154 and 165 therefore, the two secondary voltages so developed constitute electrical signals representative of fine increments in the $$TR \cos \theta \cos \phi \text{ and } TR \sin \theta \cos \phi$$

positions of the yokes 150 and 151, and these signals are employed for fine corrections of the position of the center of the rotating cutting tool with respect to the workpiece.

X AND Y DRIVING UNIT OF FIG. 9 AND THE Z DRIVING UNIT OF FIG. 10

Referring to the Z driving unit of FIG. 10, there is coupled to nut 174 the quadrature winding member 176 of fine data linear position measuring transformer or Inductosyn generally indicated at 177 similar to the transformers like 143, 165, etc., in FIGS. 7 and 8. The continuous winding 206 of transformer 177 is fastened in the frame of reference with which lead screw 207 is journaled and with respect to which nut 174 moves. The single winding 206 is connected into a servoloop including, for transformer 177 and its associated lead screw 207, an amplifier 208 and a motor 209. While each of the continuous windings and each of the quadrature windings of the transformers like 177 is a two-terminal winding, there is shown in FIGS. 7 to 10 for clarity only one lead or cable connecting to each of these transformer windings.

Referring to FIG. 10, if the quadrature winding 176 is energized with the pair of voltages in line 129 from Inductosyn 120 in FIG. 8, there will be induced in the winding 206 error voltages which will, via the associated servo loop, drive the nut 174 to positions of zero error voltage, i.e., the nut 174 will be driven in accordance with fine increments in $TR \sin \theta$. In order to drive nut 174 instead according to the sum of fine increments in $z + \Delta \Delta z - TR \sin \theta$, means are provided for effecting addition of fine increments in the $z$ value to the fine increments in the $TR \sin \theta$ output signals of the computer, the minus sign in the case of $TR \sin \theta$ being taken care of by an appropriate selection of leads at the slider windings of Inductosyn 120. When $z$ or $z + \Delta \Delta z$ is available as a mechanical rotation, as it is in shaft 172, from differential gear DG7, FIG. 6, such addition may be performed in differential resolvers like 133 for the $z$ coordinate. In FIG. 9, a similar differential resolver 210 is provided to add the fine increments of $\Delta x$ in line 157 and the command instruction X in shaft 122 from differential gear DG5, FIG. 5. Likewise the differential resolver 211 in FIG. 9 is provided to add the fine increments of $\Delta y$ in line 200 and the Y instruction in shaft 169 from the differential gear DG6, FIG. 5.

These resolvers 133, 210 and 211, are transformers including relatively rotatable rotor and stator members having each a pair of windings in space quadrature. They are indicated diagrammatically in FIGS. 9 and 10 by means of circles axially coupled to shafts 122, 169 and 172, each represented by a dashed line. With each circle for resolvers 133, 210 and 211 are shown two pairs of crossed windings. Each pair of windings represents two windings in space quadrature, one pair being on a stator member and the other on a rotor member, the shaft being coupled to the rotor member. The two windings of each pair are in space quadrature of the cycle of rotor-stator rotation over which the amplitude of the voltage induced from a winding of one pair into a winding of the other pair passes through a complete cycle from maximum amplitude in one time phase to maximum amplitude in the opposite time phase and back to maximum amplitude in the first time phase. This cycle usually amounts to 360° of rotor-stator rotation.

Either pair of quadrature windings may act as primaries and the other as secondaries. The variation with rotor-stator position in the amplitudes of the secondary voltages due to each primary voltage is sinusoidal, with a 90° difference in the phase of the variations between the two secondaries. Accordingly, the voltage of each primary, as induced into its secondary, is resolved into components which are to each other as the sine and cosine of the departure of the transformer members from a reference angular position in which one secondary voltage is zero and the other is at a maximum. Resolvers are therefore capable of taking the sines and cosines of the sum of two angles, one angle being introduced in terms of rotor-stator position and the other in terms of the ratio of primary voltage amplitudes. Highly accurate resolvers of this type are described in the co-pending application of Robert W. Tripp, Serial No. 536,464, filed Sept. 26, 1955, entitled "Microsolver" which is assigned to the assignee hereof, now Patent 2,900,612, August 18, 1959.

For resolvers 210, 211, FIG. 9, and 133, FIG. 10, the rotor angle inputs represent increments in the X, Y and Z values respectively of the desired workpiece contour. Program units D3 to D5 of FIG. 1, coupled to resolvers 210 and 211 via shafts 122 and 169, and program units D8 to D10 are coupled to resolver 133 via shaft 172, the mechanical outputs of the program units to these shafts being such that one rotation of those shafts represents in each case a change in X, Y or Z equal to the pole cycle of the transformer 177 in FIG. 10 and the corresponding transformers 212 and 213 in FIG. 9. The X and Y servo circuits including servo motors 214 and 215 are similar to the Z servo circuit which includes servo motor 209.

Shaft 122 is driven by the shaft S11 of the cylinder of the X integrator BDC2 in FIG. 3, plus the $\Delta \Delta x$ correction added by the differential gear DG5 in FIG. 5 and is an input to the fine data resolver 210, in FIG. 9, which operates as a transmitter for the fine data element 212, as well as an input through the 10-to-1 gearing 117 to the medium resolver transmitter 217 and the coarse potentiometer transmitter 218. These transmitter elements 210, 217 and 218 of FIG. 9, pertain to positioning the X machine element or nut 192, in accordance with the algebraic sum of the command instruction in shaft 122 and the tool radius correction instruction in the form of electrical signals in the lines 157, 156 and 155 from their respective fine, medium and coarse data transmitters 154, 153 and 152 in FIG. 7. In a similar way, the Y machine element or nut 220 of FIG. 9, receives its instruction, in part, from the command instruction in shaft 169 which operates the fine data resolver 211 which functions as a differential synchro transmitter for the fine data element 213, the shaft 169 operating through the 10-to-1 gearing 123 to operate the resolver 221 which functions as a differential synchro transmitter of medium data, and also operating the coarse potentiometer transmitter 222. These transmitter elements 211, 221 and 222 pertain to positioning the Y machine element or nut 220 in accordance with the algebraic sum of the command instruction in shaft 169 and the tool radius correction instruction in the form of electrical signals in the lines 200, 199 and 198 from their respective fine, medium and coarse data transmitters 165, 159 and 158 in FIG. 7.

In connection with the X drive, the coarse potentiometer 238 of FIG. 9 is a receiver for its transmitter 218 and is connected in opposition with its shaft instruction transmitter 218 and with its tool radius instruction transmitter 152 through the primary winding 239 of a transformer 240, a source of voltage 241 being provided for these elements. Transformer 240 has a secondary winding 242 which supplies the coarse error signal to switch SW1 over line 243. The fine error signal from stationary winding 244 of transformer 212 is lead to switch SW1 over line 245. The four winding resolver 217 provides an input to the quadrature windings 246 of the medium resolver receiver 247 which has a single winding 248 which transmits the medium error signal over line 249 to switch SW1. The coarse receiver 238 and the medium resolver 247 are driven from shaft 250 through the 10-to-1 gearing 166, like gearing 117. As in usual servo practice, the servo motor 214 drives the nut or driven element 192, in coarse, medium and fine increments as called for by the instruction in the transmitters 152 and 218, 217 and 210, this instruction being $TR \cos \theta \cos \phi$ which is the X component of the slope $\theta$ and $TR \cos \phi$.

In a similar way for Y, the coarse potentiometer receiver 251 of FIG. 9 is provided for the coarse potentiometer transmitter 222 and the coarse potentiometer transmitter 158, a source 252 being provided, the coarse error signal being fed through transformer 253 to switch SW2 as described above. Also, the medium resolver 254 is a receiver for its transmitter 221, the coarse and medium elements 251 and 254 being driven from shaft 255 by the 10-to-1 gearing 175, and the coarse and medium error signals therefrom being supplied to switch SW2 to control servo motor 215 and to drive the driven element 220 to a position called for by the instruction in the transmitters 222 and 158, 221 and 211, this instruction being $TR \sin \theta \cos \phi$ which is the Y component of the slope angle $\theta$ and $TR \cos \phi$.

In a similar way for Z, as shown in FIG. 10, the coarse potentiometer receiver 256 is provided for the coarse potentiometer transmitter 131 and the coarse potentiometer transmitter 164', a source 257 being provided, the coarse error signal being fed through transformer 258 to switch SW3, as described above. Also, the medium resolver 259 is a receiver for its transmitter 132, the coarse and medium elements 256 and 259 being driven from shaft 207 by the 10-to-1 gearing 119, and the coarse and medium error signals therefrom being supplied to switch SW3 to control servo motor 209 and to drive the driven element 174 to a position called for by the instruction in the transmitters 164' and 131, 132 and 133, this instruction being $TR \sin \phi$ which is the Z component of $\phi$ and TR.

Referring to FIG. 8, if the pole cycle of the linear position measuring transformers 149, 231 and 120 is the same, as is convenient, the calibration of the TR input data unit 100 should be such that one revolution of shaft 89 represents a change in TR equal to the pole cycle of the X, Y and Z fine data transformers 212, 213 and 177. Negative values of TR, for the cutting of inside as contrasted with outside profiles, may be realized by excursions of pin 82 in the opposite direction from the center of table 160.

Physically, the differential resolver-type fine data transmitting elements 210, 211 and 133, and their associated coarse data elements 218, 222 and 131 and medium elements 217, 221 and 132 may conveniently be located at the program units D2 to D11 of FIGS. 1 and 2 where the shaft rotations therefor are directly available.

PROGRAM ADVANCE, SUPERVISORY CONTROL OF FEED RATE, AND GENERAL OPERATION

In connection with the binary gear devices VG1 in FIG. 1 and VG2 in FIG. 2, S.N. 557,035 describes and claims the sequence of operation of the binary gear device in relation to the program advance, with transfer of the input data on the card to stepping switches (not shown here) and the transfer of the decoded binary information on the steppers to holding circuits, to make such control available for quick speed change, while releasing the steppers to receive the next data. These features as described and claimed in S.N. 557,035 include the octal-to-binary translator, differential gear ratio, and sequence of operation of the binary gear device in relation to the program advance. Such features are not being claimed here, but may be applied to three-dimensional operation as indicated herein.

As disclosed and claimed in S.N. 557,035 provision may be made for reversing the input or output of the binary gear ratio device VG1 and VG2 in order to provide both negative and positive values of rate of change of curvature and a "Read-In" circuit may be provided to "Read" the punched card or tape at a relatively slow rate and during times when the previous information is being held in the double relays $2^0$ to $2^9$ on clutch coils, which makes it possible to change the information on the clutch coils very rapidly and at an accurately chosen time or under accurately chosen conditions.

The error signal circuits for motors M1, M2 and 41 in FIG. 1 also motors 65 and 63 in FIG. 2, motor 147 in FIG. 7, motor 86 in FIG. 8, motors 214 and 215, FIG. 9 and motor 209, FIG. 10 are shown as a single line, whereas a complete circuit is understood and is well known.

Concerning the general operation, it is assumed that the origin is established by, (a) the machine itself in motion, (b) hand cranks on the machine, or (c) with a manual zero offset control as described and claimed in S.N. 557,035, being also disclosed and claimed in S.N. 638,722.

It has been found unnecessary to stop the feed rate drive during the time that the slope and curvature servo motors are operating to adjust the $\theta$ and $\phi$ shafts indicated at 4 and 5 in FIGS. 1 and 2 in accordance with the current segment of the input data and accordingly such control is not disclosed herein, whereby the feed rate drive FR is maintained in continuous operation during the time successive bits of slope, curvature and rate of curvature change input data are adding their instructions to the $\theta$ and $\phi$ shafts. The switches indicated at S30 for motor 41, at S10 for motor M2 in FIG. 1 and also at S8 for motor 63 and at S9 for motor 65 in FIG. 2 each represents a manual or program advance switch which is closed at the start of adding a new bit of input instruction, each such switch being held closed until the error current to its respective motor is null, and each such switch again being actuated manually or by the program advance when the next bit of input data is to be added to the operation.

At the start of any segment, the X, Y and Z positions, the slope and the curvature are adjusted to match the digital input information. A rate of change of curvature is inserted at the beginning of the segment and is held constant until the end point of this segment.

The feed is integrated in the rate change of curvature gear box and appears at its output as a value corresponding to the change in curvature which is then added to the initial curvature data by means of mechanical differential DG2. The feed rate is also integrated in the integrator BDC1 whose integration rate is established by the net curvature out of differential DG2. The integrated curvature, which represents the change in slope since the previous point, is added to the slope value for the previous point in differential DG1.

From the above it can be seen that a fixed value of rate of change of curvature can result in a curve having varying curvature and slope.

The general operation may be summarized as follows.

According to the three-dimensional aspect of present invention, normally the $x$, $y$ and $z$ positions and the three-dimensional values of slope, curvature and rate of change of curvature are supplied as the initial starting conditions. Corrections are made only when close to a check point, i.e., only at or near the end of a segment. However, the values of $\theta$ and $\phi$ and the resulting values of feed rate on the three coordinate axes are continuously changing as a result of the integration performed. For example, in FIG. 1, the shaft S3 coming out of the variable gear ratio VG1 has a curvature instruction and is fed continuously into the curvature integrator BDC1. Through the differential DG2, the curvature correction information is fed into the same integrator through the other side of this differential on shaft S2. Likewise, the output of the curvature integrator BDC1 on shaft S1 has a slope angle instruction and feeds into one side of differential DG1. The slope angle correction information is fed into the other side of this differential from motor 41. This pertains to the value of $x$ and $y$ for obtaining the $\theta$ instruction in shaft 4, and a similar situation exists for obtaining the $\phi$ instruction in shaft 5 as shown in FIG. 2, from input data pertinent to $z$. Thus, a similar situation exists for the three-dimensional values $x$, $y$ and $z$, as the value of any of the variables, except the rate of change of curvature, is at any time the sum of the result of integration which proceeds continuously and the initial or correction information which is fed in at discreet points. As there are two sources of information for each variable, this information can be both fixed and changing at the same time.

The position, slope and curvature three-dimensional variables thus obtain their values from two sources; (1) the integration outputs of the $x$, $y$ and $z$ integrators; (2) by differential input from their respective drive motors. Corrections are made starting shortly before a check point to differentially add in, by the $x$ and $y$ differentials DG1 and DG2 in FIG. 1 and by the $z$ differentials DG3 and DG4 in FIG. 2, such values of the above mentioned variables as are required to make the values of $\theta$ and $\phi$ agree with the corresponding values derived from the primary input data of slope and curvature D3, D4, D8 and D9, and at the same time that these corrections are made, the corresponding increments $\Delta\Delta x$, $\Delta\Delta y$ and $\Delta\Delta z$ are added in differentially, by the differential gears DG5 and DG6 in FIG. 5 and DG7 in FIG. 6 to the $x$, $y$ and $z$ shaft positions respectively, which determine the positions of the $x$ and $y$ driven elements 192 and 220 in FIG. 9 and the $z$ driven element 174 in FIG. 10.

The two-dimensional aspect of the present invention uses only the value of $\theta$, not requiring the value of $\phi$, and two-dimensional features of the invention will be readily understood from the preceding description.

Various modifications may be made in the invention without departing from the spirit of the following claims.

I claim:

1. A control system for a machine tool having a plurality of parts movable relative to axes X, Y and Z, the relative positions of said parts defining a path with reference to said axes, said control system comprising separate means providing three dimensional slope data of a desired path for said parts in the plane of two of said axes and out of said plane, a feed rate drive, separate means having inputs from said data supplying means respectively for translating said slope data in the plane of two of said axes and out of the plane thereof into co-function values and means for integrating said feed rate drive with the co-function values of said translating means to thereby provide shaft drives, said shaft drives representing actual values $x$, $y$ and $z$ of the parts on said X, Y and Z axes respectively, means providing linear data of the ordinates, with respect to said X, Y and Z axes, of an ideal position on the desired path, means for translating said linear data into electrical signals having values $x_0$, $y_0$ and $z_0$, means having inputs of said shaft drives translating means and linear data translating means for translating the slope data of said shaft drives and said linear data signals into coordinate correction signals proportional to the algebraic sum of $x$ and $x_0$, and $y$ and $y_0$, and $z$ and $z_0$ respectively, and means controlled by said last translating means for modifying each of said shaft drives in accordance with the corresponding said correction signal.

2. A control system for a machine tool having a plurality of parts movable relative to axes X, Y and Z, the relative positions of said parts defining a path with reference to said axes, said control system comprising separate means for supplying input command data in the plane of two of said axes and out of said plane, of the slope and one of the following characteristics of a desired path for said parts, i.e., curvature and rate of change of curvature, separate means each having an input from one of said data supplying means for converting said command data into an electrical command signal, and means having inputs from said converting means for translating said command signals into a shaft drive pertaining to each of said axes for one of said parts, means for supplying primary input data of discrete three dimensional check positions along the desired path and means for converting said primary check data into an error signal for each axis, means controlled by said last mentioned converting means for translating each of said error signals to a shaft drive, and means for algebraically adding each of said error signal shaft drives to its corresponding command signal shaft drive.

3. A control system according to claim 2 and means for preventing the operation of said adding means until said parts define a position close to a check position represented by said primary data supplying means.

4. A control system for a machine tool having a plurality of parts movable relative to three-dimensional axes on a path with reference to said axes, said system comprising means for supplying digital input command data in terms of angles of the slope of a desired path in three dimensions with reference to said axes and means having an input of said supplying means for converting the slope data thereof to analog command signals with an unwanted error due to said converting means, means providing other digital input data in three dimensions with reference to said axes of check points along the desired path, means having an input of said check data providing means for converting the data thereof into analog check signals proportional to the error, in the position of said parts, represented by said command signals, means controlled by both of said converting means for modifying said command signals in accordance with their respective said check signals while maintaining the signal of said first mentioned converting means, and means having an input of the modified command signals from said last mentioned means for translating the modified command signals into a drive for each of said parts.

5. A control system according to claim 4, and means for reading-in a subsequent portion of said input command data into their respective converting means when said error signals are substantially zero and with said drives for said parts in position with said parts defining a correct position on the path designated by the check signals of said other input data.

6. A control system for a machine tool having a plurality of parts movable relative to three coordinate axes, the relative positions of said parts defining a path with reference to said axes, said system comprising means for supplying three dimensional digital input data of the slope of a desired path for said parts, and means having an input from said supplying means for converting said data to analog form consisting of a control drive for each of said parts, means providing other three dimensional digital input data of check points along said path, means having an input from said last mentioned means for converting said other data into analog correction drives proportional to the error in the three dimensional position of said parts with respect to the desired path, and controlled drive means having inputs of said control drive for each of said parts and said correction drives for operating said parts in accordance with the combined effects of each of said first mentioned drives and the corresponding one of said correction drives, respectively, said control drive for each of said parts acting to maintain the instruction of its said data by its said converting means during the action of said controlled drive means.

7. A control system for a machine tool having a plurality of parts movable relative to three coordinate axes, the relative positions of said parts defining a path with reference to said axes, said system comprising means providing a shaft rotation representative of slope data of a desired path in a plane defined by two of said axes, means providing another shaft rotation representative of slope data of the desired path out of said plane, means providing coordinate shaft drives for said parts respectively in accordance with the corresponding slope instructions of said first two mentioned shafts, means for supplying input data in three dimensions of coordinate check points along the path, means having an input of said last mentioned supplying means for converting said check point data into coordinate check signals representing the ideal position on the desired path of said parts with respect to each of said axes, means providing for each axis a correcting shaft rotation in accordance with the difference between the position represented by said feed rate shaft drives and the corresponding ideal position represented by said check signals, a relay jointly controlled by said two first mentioned slope data shaft rotations and by said coordinate check signals, and means including a circuit controlled by said relay for correcting said shaft drives for said parts in accordance with said correcting shaft rotations, respectively.

8. A control system for a machine tool having a plurality of parts movable relative to three coordinate axes, the relative positions of said parts defining a path with reference to said axes, means for supplying (first) input command data of one of the following characteristics of a desired path, i.e., slope, curvature and rate of change of curvature of the path in the plane of two of said axes and means for supplying other (second) input command data of said one characteristic of the path out of said plane, separate means having inputs from each of said supplying means respectively for converting each of said command data into a command signal and means having an input of one of said converting means for servoing said command signals of said first data for translating said last mentioned command signals into the angular movement of a shaft representative of the slope angle of said path in said plane and means having an input of another of said converting means for servoing said command signals of said second data for translating said last mentioned command signals into the angular movement of another shaft representative of the slope angle of said path out of said plane, means for resolving movements of said shafts into co-function movements of other means, a feed rate drive, means for integrating said other means with the feed rate of said drive to thereby provide shaft drives for said parts representative of the instantaneous three dimensional coordinate positions of said parts, separate means supplying primary input data of discrete points along the desired path in said plane and out of said plane and means for translating said primary data into check signals, means jointly controlled by said shaft drives and by said check signals for converting and resolving said command data and said primary data of their respective supplying means into three coordinate error shaft drives having movements proportional to the difference between the actual position of said parts as represented by said shaft drives and their ideal position on the desired path as designated by the primary data of its supplying means, and means having an input of said shaft drives and said error shaft drives for providing other shaft drives for said parts, said other shaft drives having a feed rate drive instruction dependent on the combined effect of both of said last mentioned drives.

9. A control system according to claim 8 comprising means for rendering said error shaft drives active when the difference between said ideal and actual positions of said parts as represented as before mentioned, is small, means for rendering both of said servoing means active when movement of said error shaft drives is small and means for reading-in each of said command input data into their respective converting means when movement of said error shaft drives is substantially zero.

10. A control system for a machine tool having a plurality of parts movable relative to three coordinate axes, the relative positions of said parts defining a path with reference to said axes, said system comprising means for supplying three dimensional command data of a desired path for said parts with respect to said axes, said desired path having a slope $\theta$ with respect to the plane of two of said axes and a slope $\phi$ out of said plane, means responsive to said command data supplying means for operating a control feed rate drive for said parts, said control drive representing said desired path with an unwanted error, means for supplying three dimensional primary data of a check point on said desired path and means having an input of said last mentioned supplying means for translating the primary data thereof into electrical signals, means having inputs of said data supplying means for providing shaft drives proportional to said slopes $\theta$ and $\phi$, and resolver means having inputs of said last mentioned shaft drives and electrical inputs of the primary data signals of its said translating means for computing three dimensional coordinate signals proportional to the amount by which said parts would miss the check point if said parts were to advance at the $\theta$ and $\phi$ slopes dependent on said command data.

11. A machine tool control for parts relatively movable respectively along two axes of a plane and along a third axis out of said plane, the instantaneous positions of said parts locating a path with reference to said axes, said control comprising means supplying command data of a desired path for said parts, means having an input of said supplying means for translating said data into a control feed rate drive for each of said parts, a controlled drive derived from said control drive, said control drive having an unwanted error due to said translating means, means supplying three dimensional data of ideal positions on the path along which said parts are directed by said command data, means having an input of said last mentioned supplying means for translating said ideal position data into check signals representing said ideal position of each of said parts, means having an input of said last mentioned translating means for correcting said control drive for said parts in accordance with said check signals, and means for translating said control drive thus corrected into said controlled drive for said parts in a plurality of grades of increments, one of which is a relatively fine increment.

12. A machine tool control according to claim 11, said means for translating said ideal position data into check signals including means for translating the same into check signals in a plurality of grades of increments, one of which is a fine increment, and means whereby said correcting means operates in accordance with said plurality of grades of increments.

13. A tool control system for a machine tool having a plurality of parts movable relative to axes X, Y and Z, the relative position of said parts defining a path with reference to said axes, said control system comprising means providing digital slope data in terms of angles of the component of the path in the plane of two of said axes and other means providing similar slope data of the path component out of said plane, means having an input from said first mentioned data providing means for converting the slope data thereof into an (first) electrical command signal and other means having an input from said second mentioned data providing means for converting the slope data thereof into a (second) electrical command signal, said first signal being an input to means for translating said first signal into angular movement of a (first) shaft, said second signal being an input to means for translating said second signal into angular movement of a (second) shaft, separate means for resolving said rotation of shafts into co-function component drives, a feed rate drive, and means for integrating said feed rate drive with each of said co-function component drives to provide an integrated drive for each of said axes, said integrated drives providing feed rate instruction for said parts characteristic of said path, a corresponding set of three other drives each operated by and repeating the instruction of one of said integrated drives, a machine drive for each of said parts driven by one of said other drives and means for modifying each of said other drives to modify the instruction thereof while said integrated drives retain their respective instructions.

14. A control system according to claim 13 comprising separate means for correcting the discrepancy between the slope instruction of each of said converting means and the corresponding data of its respective said slope data providing means.

15. A tool control system according to claim 13, said modifying means comprising means for supplying input data of discrete check positions along the path and means having an input from said last mentioned supplying means and from said other drives and from said first and second shafts for converting such inputs into signals defining the error of the position of said parts, and means having an input of said error signals for controlling said other drives to correct said position.

16. A control system for a machine tool comprising a separate primary drive for each of three co-ordinate axes, a feed rate drive, separate means providing a slope instruction in the plane of said axes and out of said plane for a path, and means whereby each of said primary drives constitutes an integrated feed rate drive derived from integration of said feed rate drive with the slope instruction of its said providing means, said primary drives defining the path with reference to said axes, a secondary drive each operated by and repeating the integrated feed rate instruction of its respective primary drive, a machine drive driven by each of said secondary drives and means for modifying each of said secondary drives without changing its respective primary drive, separate means providing input data in said plane and out of said plane of slope of the path, means having an input of said providing means for converting the slope data thereof into the slope instruction of said slope instruction providing means, and means for correcting the discrepancy between the slope instruction of said converting means and the corresponding slope instruction of said slope data providing means.

17. A control system for a machine tool comprising a separate primary drive for each of three co-ordinate axes, a feed rate drive, separate means providing a slope instruction and a curvature instruction in the plane of two of said axes and out of said plane for a path with respect to said axes and means whereby each of said primary drives constitutes an integrated feed rate derived from integration of said feed rate drive with the slope and curvature instructions of its said providing means, said primary drives defining the path with reference to said axes, a secondary drive each operated by and repeating the integrated feed rate instruction of its respective primary drive, a machine drive driven by each of said secondary drives and means for modifying each of said secondary drives without changing its respective primary drive, separate means providing input data in said plane and out of said plane of slope and curvature of the path, separate means each having an input of its respective said data providing means for converting said slope data and curvature data respectively into the slope and curvature instruction of their respective providing means, and separate means for correcting the discrepancy between the slope and curvature instructions of their said converting means and the corresponding respective slope and curvature instructions of their respective data providing means.

18. A control system for a machine tool comprising a separate primary drive for each of three co-ordinate axes, a feed rate drive, separate means providing a slope instruction, a curvature instruction and a rate of change of curvature instruction in the plane of two of said axes and out of said plane for a path with respect to said axes and means whereby each of said primary drives constitutes an integrated feed rate drive derived from integration of said feed rate drive with the slope, curvature and rate of change of curvature instructions of its said providing means, said primary drives defining the path with reference to said axes, a secondary drive each operated by and repeating the integrated feed rate drive instruction of its respective primary drive, a machine drive driven by each of said secondary drives and means for modifying each of said secondary drives without changing its respective primary drive, separate means providing input data in said plane and out of said plane of slope, curvature and rate of change of curvature of the path, separate means each having an input of its respective said data providing means for converting said slope data, curvature data and rate of change of curvature data respectively into the slope, curvature and rate of change of curvature instruction of their respective providing means, and separate means for correcting the discrepancy between the slope, curvature and rate of change of curvature instructions of their respective said converting means and the corresponding respective slope, curvature and rate of change of curvature data of their respective providing means.

19. A machine control system comprising separate means providing input data in terms of slope, curvature and rate of change of curvature of a path with respect to three co-ordinate axes and input data of feed rate drive, separate means each having an input from one of said providing means for converting each of said data into an analog signal, separate means for translating said slope, curvature and rate of change of curvature data signals into rotation of (first) and (second) shafts having instructions of slope in the plane of two of said axes and out of said plane respectively and means for resolving rotation of said (first) and (second) shafts into co-function component drives for said axes respectively, an integrator for integrating the feed rate drive of its said providing means with each of said co-function component drives to provide three integrated feed rate shaft drives, means for translating said integrated feed rate shaft drives into a machine drive on each of said axes to define the path by their relative positions, subject to error, means for correcting said error comprising means providing separate input linear data for each of said axes with respect to ideal positions on the path, means having an input of said last mentioned data providing means for converting the linear data thereof into analog signals, computing means having inputs of (a) the linear data analog signals from its said converting means, (b) said integrated feed rate shaft drives and (c) slope instruction of said first and second shafts, said computing means acting to translate said inputs (a) to (c) into an output proportional to the separation between actual path positions defined by said machine drives due to said integrated feed rate shaft drives and ideal path positions as designated by the input linear data of its said providing means.

20. A control system for a machine tool having a plurality of parts movable relative to axes X and Y, the relative positions of said parts defining a path with reference to said axes, said control system comprising separate means providing two dimensional slope data of a desired path for said parts in the plane of said axes, a feed rate drive, separate means having inputs from said data supplying means respectively for translating said slope data in the plane of said axes into co-function values and means for integrating said feed rate drive with the co-function values of said translating means to thereby provide shaft drives, said shaft drives representing actual values $x$ and $y$ of the parts on said X and Y axes respectively, means providing linear data of the ordinates, with respect to said X and Y axes, of an ideal position on the desired path, means for translating said linear data into electrical signals having values $x_0$ and $y_0$, means having inputs of said shaft drives translating means and linear data translating means for translating the slope data of said shaft drives and said linear data signals into coordinate correction signals proportional to the algebraic sum of $x$ and $x_0$, and $y$ and $y_0$ respectively, and means controlled by said last translating means for modifying each of said shaft drives in accordance with the corresponding said correction signal 21. A control system for a machine tool having a plurality of parts movable relative to axes X and Y, the relative positions of said parts defining a path with reference to said axes, said control system comprising separate means for supplying input command data in the plane of said axes, of the slope and one of the following characteristics of a desired path for said parts, i.e., curvature and rate of change of curvature, separate means each having an input from one of said data supplying means for converting said command data into an electrical command signal, and means having inputs from said converting means for translating said command signals into a shaft drive pertaining to each of said axes for one of said parts, means for supplying primary input data of discrete two dimensional check positions along the desired path and means for converting said primary check data into an error signal for each axis, means controlled by said last mentioned converting means for translating each of said error signals to a shaft drive, and means for algebraically adding each of said error signal shaft drives to its corresponding command signal shaft drive.

22. A control system according to claim 21 and means for preventing the operation of said adding means until said parts define a position close to a check position represented by said primary data supplying means.

23. A control system for a machine tool having a plurality of parts movable relative to two-dimensional axes on a path with reference to said axes, said system comprising means for supplying digital input command data in terms of angles of the slope of a desired path in two dimensions with reference to said axes and means having an input of said supplying means for converting the slope data thereof to analog command signals with an unwanted error due to said converting means, means providing other digital input data in two dimensions with reference to said axes of check points along the desired path, means having an input of said check data providing means for converting the data thereof into analog check signal proportional to the error, in the position of said parts, represented by said command signals, means controlled by both of said converting means for modifying said command signals in accordance with their respective said check signals while maintaining the signal of said first mentioned converting means, and means having an input of the modified command signals from said last mentioned means for translating the modified command signals into a drive for each of said parts.

24. A control system according to claim 23, and means for reading-in a subsequent portion of said input command data into their respective converting means when said error signals are substantially zero and with said drives for said parts in position with said parts defining a correct position on the path designated by the check signals of said other input data.

25. A control system for a machine tool having a plurality of parts movable relative to two coordinate axes, the relative positions of said parts defining a path with reference to said axes, said system comprising means for supplying two dimensional digital input data of the slope of a desired path for said parts, and means having an input from said supplying means for converting said data to analog form consisting of a control drive for each of said parts, means providing other two dimensional digital input data of check points along said path, means having an input from said last mentioned means for converting said other data into analog correction drives proportional to the error in the two dimensional position of said parts with respect to the desired path, and controlled drive means having inputs of said control drive for each of said parts and said correction drives for operating said parts in accordance with the combined effects of each of said first mentioned drives and the corresponding one of said correction drives, respectively, said control drive for each of said parts acting to maintain the instruction of its said data by its said converting means during the action of said controlled drive means.

26. A control system for a machine tool having a plurality of parts movable relative to two coordinate axes, the relative positions of said parts defining a path with reference to said axes, said system comprising means providing a shaft rotation representative of slope data of a desired path in a plane defined by said axes, means providing coordinate feed rate shaft drives for said parts respectively in accordance with the corresponding slope instructions of said shaft, means for supplying input data in two dimensions of coordinate check points along the path, means having an input of said last mentioned supplying means for converting said check point data into coordinate check signals representing the ideal position on the desired path of said parts with respect to each of said axes, means providing for each axis a correcting shaft rotation in accordance with the difference between the position represented by said feed rate shaft drives and the corresponding ideal position represented by said check signals, a relay jointly controlled by said first mentioned slope data shaft rotation and by said coordinate check signals, and means including a circuit controlled by said relay for correcting said feed rate shaft drives for said parts in accordance with said correcting shaft rotations, respectively.

27. A control system for a machine tool having a plurality of parts movable relative to two coordinate axes, the relative positions of said parts defining a path with reference to said axes, means for supplying input command data of slope and one of the following characteristics of a desired path, i.e., curvature and rate of change of curvature of the path in the plane of two of said axes, means having an input from said supplying means for converting said command data into a command signal and means having an input of said converting means for servoing said command signals of said data supplying means for translating said last mentioned command signals into the angualr movement of a shaft representative of the slope angle of said path in the plane of said axes, means for resolving movements of said shaft into co-function movements of other means, a feed rate supply, means for integrating said other means with the feed rate of said supply to thereby provide shaft drives for said parts representative of the instantaneous two dimensional coordinate positions of said parts, separate means supplying primary input data of discrete points along the desired path in said plane and means having an input of last mentioned supplying means for translating the primary data thereof into check signals, means jointly controlled by said shaft drives and by said check signals for converting and resolving said command data and said primary data of their respective supplying means into two coordinate error shaft drives having movements proportional to the difference between the actual position of said parts as represented by said drives and their ideal position on the desired path as designated by the primary data of its supplying means, and means having an input of said shaft drives and said error shaft drives for providing other shaft drives for said parts, said other shaft drives having a feed rate instruction dependent on the combined effect of both of said last mentioned drives.

28. A control system according to claim 27 comprising means for rendering said error shaft drives active when the difference between said ideal and actual positions of said parts as represented as before mentioned, is small, means for rendering said servoing means active when movement of said error shaft drives is small and means for reading-in said command input data into its respective converting means when movement of said error shaft drives is substantially zero.

29. A control system for a machine tool having a plurality of parts movable relative to two coordinate axes, the relative positions of said parts defining a path with reference to said axes, said system comprising means for supplying two dimensional command data of a desired path for said parts with respect to said axes, said desired path having a slope $\theta$ with respect to the plane of said axes, means responsive to said command data supplying means for operating a control feed rate drive for said parts, said control drive representing said desired path with an unwanted error, means for supplying two dimensional primary data of a check point on said desired path and means having an input of said last mentioned supplying means for translating the primary data thereof into electrical signals, means having inputs of said data supplying means for providing a shaft drive proportional to said slope $\theta$, and resolver means having inputs of said last mentioned shaft drive and electrical inputs of the primary data signals of its said translating means for computing two dimensional coordinate signals proportional to the amount by which said parts would miss the check point if said parts were to advance at the $\theta$ slope dependent on said command data.

30. A machine tool control for parts relatively movable respectively along two axes of a plane, the instantaneous positions of said parts locating a path with reference to said axes, said control comprising means supplying command data of a desired path in the plane for said parts, means having an input of said supplying means for translating said data into a control feed rate drive for each of said parts, a controlled drive derived from said control drive, said control drive having an unwanted error due to said translating means, means supplying two dimensional data of ideal positions of the path along which said parts are directed by said command data, means having an input of said last mentioned supplying means for translating said ideal position data into check signals representing said ideal position of each of said parts, means having an input of said last mentioned translating means for correcting said control drive for said parts in accordance with said check signals, and means for translating said control drive thus corrected into said controlled drive for said parts in a plurality of grades of increments, one of which is a relatively fine increment.

31. A machine tool control according to claim 30, said means for translating said ideal position data into check signals in a plurality of grades of increments, one of which is a fine increment, and means whereby said correcting means operates in accordance with said plurality of grades of increments.

32. A tool control system for a machine tool having a plurality of parts movable relative to axes X and Y, the relative position of said parts defining a path with reference to said axes, said control system comprising means providing digital slope data in terms of angles of the component of the path in the plane of said axes, means having an input from said data providing means for converting the slope data thereof into an electrical command signal, said signal being an input to means for translating said signal into angular movement of a shaft, separate means for resolving said shaft rotation into co-function component drives, a feed rate drive, and means for integrating said feed rate drive with each of said co-function component drives to provide an integrated feed rate drive for each of said axes, said integrated feed rate drives providing feed rate instruction for said parts characteristic of said path, a corresponding set of two other drives each operated by and repeating the instruction of one of said integrated feed rate drives, a machine drive for each of said parts driven by one of said other drives and means for modifying each of said other drives to modify the instruction thereof while said integrated feed rate drives retain their respective instructions.

33. A control system according to claim 32 comprising separate means for correcting the discrepancy between the slope instruction of said converting means and the corresponding data of its respective said slope data providing means.

34. A tool control system according to claim 32, said modifying means comprising means for supplying input data of discrete check positions along the path and means having an input from said last mentioned supplying means and from said other drives and from said shaft for converting such inputs into signals defining the error of the position of said parts, and means having an input of said error signals for controlling said other drives to correct said position.

35. A control system for a machine tool comprising a separate primary drive for each of two co-ordinate axes, a feed drive, means providing a slope instruction for a path in the plane of said axes, and means whereby each of said primary drives constitutes an integrated feed rate drive derived from integration of said feed rate drive with the slope instruction of its said providing means, said primary drives defining the path with reference to said axes, a secondary drive each operated by and repeating the integrated feed rate instruction of its respective primary drive, a machine drive driven by each of said secondary drives and means for modifying each of said secondary drives without changing its respective primary drive, means providing input data of the path in said plane, means having an input of said providing means for converting the slope data thereof into the slope instruction of said slope instruction providing means, and means for correcting the discrepancy between the slope instruction of said converting means and the corresponding slope instruction of said slope data providing means.

36. A control system for a machine tool comprising a separate primary drive for each of two co-ordinate axes, a feed rate drive, separate means providing a slope instruction and a curvature instruction in the plane of said axes for a path with respect to said axes and means whereby said primary drive constitutes an integrated feed rate drive derived from integration of said feed rate drive with the slope and curvature instructions of its said providing means, said primary drive defining the path with reference to said axes, a secondary drive each operated by and repeating the integrated feed rate instruction of its respective primary drive, a machine drive driven by each of said secondary drives and means for modifying each of said secondary drives without changing its respective primary drive, separate means providing input data in said plane of slope and curvature of the path, separate means each having an input of its respective said data providing means for converting said slope data and curvature data respectively into the slope and curvature instruction of their respective providing means, and separate means for correcting the discrepancy between the slope and curvature instructions of their said converting means and the corresponding respective slope and curvature instructions of their respective data providing means.

37. A control system for a machine tool comprising a separate primary drive for each of two co-ordinate axes, a feed rate drive, separate means providing a slope instruction, a curvature instruction and a rate of change of curvature instruction, in the plane of said axes, for a path with respect to said axes and means whereby each of said primary drives constitutes an integrated feed rate drive derived from integration of said feed rate drive with the slope, curvature and rate of change of curvature instructions of its said providing means, said primary drives defining the path with reference to said axes, a secondary drive each operated by and repeating the integrated feed rate instruction of its respective primary drive, a machine drive driven by each of said secondary drives and means for modifying each of said secondary drives without changing its respective primary drive, separate means providing input data in said plane of slope, curvature and rate of change of curvature of the path, separate means each having an input of its respective said data providing means for converting said slope data, curvature data and rate of change of curvature data respectively into the slope, curvature and rate of change of curvature instruction of their respective providing means, and separate means for correcting the discrepancy between the slope, curvature and rate of change of curvature instructions of their respective said converting means and the corresponding respective slope, curvature and rate of change of curvature data of their respective providing means.

38. A machine control system comprising separate means providing input data in terms of slope, curvature and rate of change of curvature of a path with respect to two coordinate axes and input data of feed rate drive, separate means each having an input from one of said providing means for converting each of said data into an analog signal, separate means for translating said slope, curvature and rate of change of curvature data signals into rotation of a shaft having instructions of slope in the plane of said axes, and means for resolving rotation of said shaft into co-function component drives for said axes respectively, an integrator for integrating the feed rate drive of its said providing means with each of said co-function component drives to provide two integrated feed rate shaft drives, means for translating said integrated feed rate shaft drives into a machine drive on each of said axes to define the path by their relative positions, subject to error, means for correcting said error comprising means providing separate input linear data for each of said axes with respect to ideal positions on the path, means having an input of said last mentioned data providing means for converting the linear data thereof into analog signals, computing means having inputs of (a) the linear data analog signals from its said converting means, (b) said integrated feed rate shaft drives and (c) slope instruction of said shaft; said computing means acting to translate said inputs (a) to (c) into an output proportional to the separation between actual path positions defined by said machine drives due to said integrated feed rate shaft drives and ideal path positions as designated by the input linear data of its said providing means.

References Cited in the file of this patent

UNITED STATES PATENTS

| | | |
|---|---|---|
| 2,382,994 | Holden | Aug. 21, 1945 |
| 2,385,334 | Davey | Sept. 25, 1945 |
| 2,628,539 | Neergaard | Feb. 17, 1953 |
| 2,704,012 | Trinkle | Mar. 15, 1955 |
| 2,741,732 | Cunningham | Apr. 10, 1956 |
| 2,784,359 | Kamm | Mar. 5, 1957 |
| 2,820,187 | Parsons et al. | Jan. 14, 1958 |
| 2,833,941 | Rosenberg et al. | May 6, 1958 |
| 2,835,042 | Tandler et al. | May 20, 1958 |
| 2,875,390 | Tripp | Feb. 24, 1959 |

FOREIGN PATENTS

| | | |
|---|---|---|
| 1,114,501 | France | Dec. 19, 1955 |